(12) United States Patent
Shigemura et al.

(10) Patent No.: US 8,609,173 B2
(45) Date of Patent: Dec. 17, 2013

(54) COMPOSITIONS COMPRISING SWEETNESS ENHANCERS AND METHODS OF MAKING THEM

(75) Inventors: Rhondi Shigemura, Encinitas, CA (US); Carolyn Podgurski, San Diego, CA (US); Boriruck Kitisin, Carlsbad, CA (US); Jennifer Ward, Spring Valley, CA (US); Thitiwan Lebien, Carlsbad, CA (US); Ana Alatorre, San Diego, CA (US)

(73) Assignee: Senomyx Inc., San Diego, CA (US)

( * ) Notice: Subject to any disclaimer, the term of this patent is extended or adjusted under 35 U.S.C. 154(b) by 112 days.

(21) Appl. No.: 13/056,848

(22) PCT Filed: Jul. 30, 2009

(86) PCT No.: PCT/US2009/052258
§ 371 (c)(1),
(2), (4) Date: Apr. 28, 2011

(87) PCT Pub. No.: WO2010/014813
PCT Pub. Date: Feb. 4, 2010

(65) Prior Publication Data
US 2011/0195170 A1    Aug. 11, 2011

Related U.S. Application Data

(60) Provisional application No. 61/085,228, filed on Jul. 31, 2008.

(51) Int. Cl.
*A23L 1/236*       (2006.01)
(52) U.S. Cl.
USPC ........................................................ 426/548

(58) Field of Classification Search
USPC ........................................................ 426/548
See application file for complete search history.

(56) References Cited

U.S. PATENT DOCUMENTS

| | | |
|---|---|---|
| 3,278,532 A | 10/1966 | Houlihan |
| 3,843,804 A | 10/1974 | Evers et al. |
| 3,845,770 A | 11/1974 | Theeuwes et al. |
| 3,857,972 A | 12/1974 | Evers et al. |
| 3,916,899 A | 11/1975 | Theeuwes et al. |
| 3,957,783 A | 5/1976 | Hirohashi et al. |

(Continued)

FOREIGN PATENT DOCUMENTS

| | | |
|---|---|---|
| EP | 0530994 | 3/1993 |
| WO | WO 93/13104 | 7/1993 |

(Continued)

OTHER PUBLICATIONS

International Search Report based on International Patent Application No. PCT/US2009/052258, mailed on Dec. 10, 2009.

(Continued)

*Primary Examiner* — Humera Sheikh
*Assistant Examiner* — Jeffrey Mornhinweg
(74) *Attorney, Agent, or Firm* — Cooley LLP

(57) ABSTRACT

The present invention provides solid and liquid compositions comprising 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, and methods of making the compositions by spray drying and spin melting. The present invention also provides ingestible compositions comprising compositions of the present invention and methods of making such foods.

40 Claims, 4 Drawing Sheets

(56) References Cited

U.S. PATENT DOCUMENTS

| | | | |
|---|---|---|---|
| 3,960,860 A | 6/1976 | Katz et al. | |
| 4,146,716 A | 3/1979 | Cox et al. | |
| 4,196,207 A | 4/1980 | Webber et al. | |
| 4,377,580 A | 3/1983 | Ueda et al. | |
| 4,765,539 A | 8/1988 | Noakes et al. | |
| 4,960,870 A | 10/1990 | Lehmann | |
| 5,112,598 A | 5/1992 | Biesalski | |
| 5,380,541 A | 1/1995 | Beyts et al. | |
| 5,504,095 A | 4/1996 | Nakane et al. | |
| 5,556,611 A | 9/1996 | Biesalski | |
| 5,698,155 A | 12/1997 | Grosswald et al. | |
| 5,950,619 A | 9/1999 | van der Linden et al. | |
| 5,954,047 A | 9/1999 | Armer et al. | |
| 5,970,974 A | 10/1999 | van der Linden et al. | |
| 6,475,544 B1 | 11/2002 | Hiramoto et al. | |
| 6,852,862 B2 | 2/2005 | Nishizawa et al. | |
| 7,105,650 B2 | 9/2006 | Adler | |
| 7,928,111 B2 | 4/2011 | Tachdjian et al. | |
| 2002/0025366 A1 | 2/2002 | Jager et al. | |
| 2003/0008344 A1 | 1/2003 | Adler et al. | |
| 2003/0054448 A1 | 3/2003 | Adler et al. | |
| 2003/0232407 A1 | 12/2003 | Zoller et al. | |
| 2004/0127435 A1 | 7/2004 | Carson et al. | |
| 2005/0032158 A1 | 2/2005 | Adler et al. | |
| 2005/0196503 A1 | 9/2005 | Srivastava | |
| 2006/0045953 A1 | 3/2006 | Tachdjian et al. | |
| 2006/0135552 A1 | 6/2006 | Malherbe et al. | |
| 2006/0257543 A1 | 11/2006 | Tachdjian et al. | |
| 2007/0003680 A1 | 1/2007 | Tachdjian et al. | |
| 2007/0010480 A1* | 1/2007 | Rusing et al. | 514/54 |
| 2007/0104709 A1 | 5/2007 | Li et al. | |
| 2008/0306053 A1 | 12/2008 | Tachdjian et al. | |
| 2008/0306093 A1 | 12/2008 | Servant et al. | |
| 2011/0224155 A1 | 9/2011 | Tachdjian et al. | |
| 2011/0230502 A1 | 9/2011 | Tachdjian et al. | |
| 2011/0245353 A1 | 10/2011 | Tachdjian et al. | |
| 2012/0041078 A1 | 2/2012 | Tachdjian et al. | |

FOREIGN PATENT DOCUMENTS

| | | |
|---|---|---|
| WO | WO 03/001876 | 1/2003 |
| WO | WO 03/022214 | 3/2003 |
| WO | WO 2007/004709 | 1/2007 |
| WO | WO 2007/047988 | 4/2007 |
| WO | WO 2008/154221 | 12/2008 |
| WO | WO2008/154221 A2 * | 12/2008 |
| WO | WO 2010/014666 | 2/2010 |

OTHER PUBLICATIONS

Written Opinion of the International Search Authority based on International Patent Application No. PCT/US2009/052258, mailed on Dec. 10, 2009.
European Search Report for EP Application No. 12175764.5, dated Feb. 22, 2013.
Alderman, D. A., "A Review of Cellulose Ethers in Hydrophilic Matrices for Oral Controlled-Release Dosage Forms," Int. J. Pharm. Tech. & Prod. Mfr., 5(3):1-9 (1984).
Bamba, M. et al., "Release Mechanisms in Gelforming Sustained Release Preparations," International Journal of Pharmaceutics, 2:307-315 (1979).
Berge, S. M. et al., "Pharmaceutical Salts," Journal of Pharmaceutical Sciences, 66(1):1-19 (1977).
Blackburn et al., "Identification and characterization of aminopiperidinequinolones and quinazolinones as MCHr1 antagonists," Bioorg. & Med. Chem. Lett. 16:2621-2627 (2006).
Boarland et al., "Monosubstituted Pyrimidines, and the Action of Thiourea on Chloropyrimidines," J. Chem. Soc., 1218-1221 (1951).
Brown, et al., "Evolution of a Series of Peptidoleukotriene Antagonists: Synthesis and Structure-Activity Relationships of 1,6-Disubstituted Indoles and Indazoles," J. Med. Chem. 33(6):1771-1781 (1990).
Buck, L. et al., "A Novel Multigene Family May Encode Odorant Receptors: A Molecular Basis for Odor Recognition," Cell, 65(1):175-187 (1991).
Calkins, N. L., "2,1-benzothiazines: preparation and reactivity," [Thesis], University of Missouri, Columbia (2010).
Campillo et al., "A study of peculiar tautomerism of pyridol[2,3-c][1,2,6]thiadiazine 2,2-dioxide system," *J Mol. Struct.*, 678:83-89 (2004).
Chandrashekar, J. et al., "T2Rs Function as Bitter Taste Receptors," Cell, 100:703-711 (2000).
Cheng, C. C. et al., "Potential Purine Antagonists. XII. Synthesis of 1-Alkyl(aryl)-4,6-disubstituted Pyrazolo[3,4-d]pyrimidines," Journal of Organic Chemistry, 23(1):852-861 (1958).
Chien et al., "Nucleosides XI. Synthesis and Antiviral Evaluation of 5'-Alkylthio-5'-deoxy Quinazolinone Nucleoside Derivatives as S-Adenosyl-L-homocysteine Analogs," *Chem. Pharm. Bull.*, 52(12):1422-1426 (2004).
Clauss et al., "Cycloadditionen von Halogensulfonylisocyanaten an Acetylene," Tetrahedron Lett. 2:119-122 (1970).
Corbett et al., "Novel 2,2-Dioxide-4,4-disubstituted-1,3-H-2,1,3-benzothiadiazines as Non-Nucleside Reverse Transcriptase Inhibitors," *Biorg. Med. Chem. Lett.*, 10:193-195 (2000).
Dominguez et al., "Efficient synthesis of 4,4-disubstituted-3,4-dihydro-1H-2,1,3-benzothiadiazine 2,2-dioxides," *Tetrahedron Lett.*, 41:9825-9828 (2000).
Dorwald, F. Z., Preface: In "Side reactions in organic synthesis: A guide to successful synthesis design," Weinheim: Wiley-VCH Verlag Gmbh & Co. KGaA (2005).
Doucet-Personeni, C. et al., "A Structure-Based Design Approach to the Development of Novel, Reversible AChE Inhibitors," J. Med. Chem., 44:3203-3215 (2001).
During, M. J. et al., "Controlled Release of Dopamine from a Polymeric Brain Implant: In Vivo Characterization," Ann. Neurol., 25:351-356 (1989).
Elmegeed et al., "Novel synthesizes aminosteroidal heterocycles intervention for inhibiting iron-induced oxidative stress," Eur. J. Med. Chem. 40:1283-1294 (2005).
El-Sherbeny et al., "Novel Pyridothienopyrimidine and Pyridothienothiazine Derivatives as Potential Antiviral and Antitumor Agents," Med. Chem. Res. 10:122-135 (2000).
Fan et al., "Transient Silylation of the Guanosine O6 and Amino Groups Facilitates N-Acylation," *Organic Letters*, 6(15):2555-2557 (2004).
Francis et al., "Anxiolytic Properties of Certain Annelated [1,2,4]Triazolo[1,5-c]pyrimidin-5(6H)-ones," J. Med. Chem. 34:2899-2906 (1991).
Garcia-Munoz et al., "Synthesis of Purine-Like Ring Systems Derived From 1,2,6-Thiadiazine 1,1-Dioxide," *J. Heterocyclic Chem.*, 13:793-796 (1976).
Goya et al., "Fused 1,2,6-Thiadiazines: Tetrahydrobenzo[b]thieno[2,3-c] [1,2,6]thiadiazine 2,2-Dioxides," Arch. Pharm. (Weinheim) 317:777-781 (1984).
Goya et al., "Aminopyrido [2,3-c] [1,2,6] Thiadiazine 2,2-Dioxides: Synthesis and Physico-chemical Properties," *Chemica Scripta*, 26:607-611 (1986).
Goya et al., "Synthesis of 2S-Dioxo Isosteres of Purine and Pyrimidine Nucleosides IV. Selective Glycosylation of 4-Amino-5H-Imidazo [4,5-c] -1,2,6-Thiadiazine 2,2-Dioxide," *Nucleosides & Nucleotides*, 6(3), 631-642 (1987).
Goya and Paez, "Pteridine Analogues; Synthesis and Physico-Chemical Properties of 7-Oxopyrazino [2,3-c][1,2,6] thiadiazine 2,2-Dioxides," *Liebigs Ann. Chem.*, 121-124 (1988).
Goya and Martinez, "Synthesis and Cytostatic Screening of an $SO_2$ Analogue of Doridosine," *Arch. Pharm.*, 321:99-101 (1988).
Goya et al., CAPLUS Accession No. 1987:18628, 2 pages, abstract of ES 531159 A1 (1985).
Harris, N. V. et al., "Antifolate and antibacterial activities of 5-substituted 2,4-diaminoquinazolines," Journal of Medicinal Chemistry, 33(1):434-444 (1990).
Hauser et al., "Synthesis of 5-Phenyl-4,6-Dimethyl-2-Pyrimidol and Derivatives from the Cyclization of Urea with 3-Phenyl-2,4-Pentanedione," J. Org. Chem. 18:588-593 (1953).

(56) References Cited

OTHER PUBLICATIONS

Hirohashi, T. et al. "Nuclear magnetic resonance studies of bicyclic thiophene derivatives. I ring current effects of the benzene ring on the H.alpha. and H.beta. signals of the thiophene ring in benzoylthiophene, thienopyrimidine, and thienodiazepine derivatives," Bulletin of The Chemical Society of Japan, 48(1):147-156 (1975).
Hirota et al., "Synthesis and Biological Evaluation of 2,8-Disubstituted 9-Benzyladenines: Discovery of 8-Mercaptoadenines as Potent Interferon-Inducers," Bioorg. Med. Chem. 11:2715-2722 (2003).
Hoon, M. A. et al., "Putative Mammalian Taste Receptors: A Class of Taste-Specific GPCRs with Distinct Topographic Selectivity," Cell, 96:541-551 (1991).
Howard, M. A. et al., "Intracerebral drug delivery in rats with lesion-induced memory deficits," J. Neurosurg., 71:105-112 (1989).
Hu et al., "Organic Reactions in Ionic Liquids: Gewald Synthesis of 2-Aminothiophenes Catalyzed by Ethylenediammonium Diacetate," Synthetic Communication 34:3801-3806 (2004).
Jordan, V. C., "Tamoxifen: A Most Unlikely Pioneering Medicine," Nature Reviews: Drug Discovery, 2:205-213 (2003).
Jung et al., "Discovery of Novel and Potent thiazoloquinazolines as Selective Aurora A and B Kinase Inhibitors," J. Med. Chem. 49:955-970 (2006).
Kamal et al., "Cyclization of 2-(Carbamoyloxy)- and 2-(Sulfamoyloxy)benzoates Mediated by Liver Microsomes," J. Org. Chem. 53:4112-4114 (1988).
Kanuma, K. et al., "Lead optimization of 4-(dimethylamino)quinazolines, potent and selective antagonists for the melanin-concentrating hormone receptor 1," Bioorg. & Med. Chem. Lett. 15(17):3853-3856 (2005).
Keith, "Synthesis and Reduction of some 1$H$-2,1,3-Benzothiadiazin-4(3H)one 2,2-Dioxides,"*J. Heterocyclic Chem.*, 15:1521-1523 (1978).
Kyte, J. et al., "A Simple Method for Displaying the Hydropathic Character of a Protein," J. Mol. Biol., 157:105-132 (1982).
Langer, R. et al., "Chemical and Physical Structure of Polymers as Carriers for Controlled Release of Bioactive Agents: A Review," J. Macromol. Sci. Rev. Macromol Chem. 23:61-126 (1983).
Langer, R., "New Methods of Drug Delivery," Science, 249:1527-1533 (1990).
Lee et al., "Acetonitrile-Mediated Synthesis of 2,4-Dichloroquinoline from 2-Ethynyl-aniline and 2,4-Dichloroquinazoline from Anthranilonitrile," Synlett, 2006 No. 1:65-68 (2006).
Leistner, S. et al., "Polycyclic azines with heteroatoms in the 1- and 3-positions, Part 22. A facile synthesis of 2-(alkylthio)-4-aminothieno[2,3-d]pyrimidines," Archiv. der Pharmazie (Weinheim, Germany), 322(4):227-230 (1989).
Levy, R. J. et al., "Inhibition of Calcification of Bioprosthetic Heart Valves by Local Controlled-Release Diphosphonate," Science, 228:190-192 (1985).
Li et al., "Human receptors for sweet and umami taste," Proc. Natl. Acad. Sci. USA 99:4692-4696 (2002).
Linkies et al., "Ein neues Verfahren zur Herstellung von 6-Methyl-1,2,3-oxathiazin-4(3H)-on-2,2-dioxid Kaliumsalz (Acesulfam-K)," Synthesis 405-406 (1990).
Liu et al., "Discovery of a new class of 4-anilinopyrimidines as potent c-Jun N-terminal kinase inhibitors: Synthesis and SAR studies," Bioorg. & Med. Chem. Lett. 17:668-672 (2007).
Martinez et al., "Benzothiadiazine Dioxide Dibenzyl Derivatives as Potent Human Cytomegalovirus Inhibitors: Synthesis and Comparative Molecular Field Analysis," *J. Med. Chem.*, 43:3218-3225 (2000).
Meyer, Jr. and Skibo, "Synthesis of Fused [1,2,6]Thiadiazine 1,1-Dioxides as Potential Transition-State Analogue Inhibitos of Xanthine Oxidase and Guanase," *J. Med. Chem.*, 22(8):944-948 (1979).
Nie, Y. et al., "Distinct Contributions of T1R2 and T1R3 Taste Receptor Subunits to the Detection of Sweet Stimuli," Current Biology, 15(21):1948-1952 (2005).

Pal et al., "Synthesis and Cyclooxygenase-2 (COX-2) Inhibiting Properties of 1,5-Diarylpyrazoles Possessing N-Substitution on the Sulfonamide (-SO2NH2) Moiety," Letters in Drug Design & Discovery 2:329-340 (2005).
PubChemCompound, datasheet[online compound summary], Retrieved from the Internet: <URL: http://pubchem.ncbi.nlm.nih.gov/summary/summary.cgi?cid12715714&loc=ec_rcs> [May 11, 2012].
Rad-Moghadam et al., "One-pot Three-component Synthesis of 2-Substituted 4-Aminoquinazolines," J. Heterocyclic Chem. 43:913-916 (2006).
Rasmussen et al., "The Electrophilic Addition of Chlorosulfonyl Isocyanate to Ketones. A Convenient Synthesis of Oxazines, Oxathiazines, and Uracils," J. Org. Chem. 38:2114-2115 (1973).
Reddy et al., "An Efficient Synthesis of 3,4-Dihydro-4-Imino-2(1H)-Quinazolinones," Synthetic Commun. 18:525-530 (1988).
Rosowsky and Modest, Quinazolines. III. Synthesis of 1,3-Diaminobenzo[f]quinazoline and Related Compounds, *J. Org. Chem.*, 31:2607-2613 (1966).
Saudek, C. D. et al., "A Preliminary Trial of the Programmable Implantable Medication System for Insulin Delivery," N. Engl. J. Med., 321(9):574-579 (1989).
Seijas et al., "Microwave enhanced synthesis of 4-aminoquinazolines," Tetrahedron Lett. 41:2215-2217. (2000).
Sharma et al., "Synthesis and QSAR studies on 5-[2-(2-methylprop 1-enyl)-1H benzimidazol-1yl]-4,6-diphenyl-pyrimidin-2-(5H)-thione derivatives as antibacterial agents," Eur. J. Med. Chem. 41:833-840 (2006).
Silve, C. et al., "Delineating a $Ca^{2+}$ Binding Pocket within the Venus Flytrap Module of the Human Calcium Sensing Receptor," The Journal of Biological Chemistry, 280(45):37917-37923 (2005).
Smith, M. B. et al., "March's Advanced Organic Chemistry. Reactions, Mechanisms, and Structure," Fifth Edition, John Wiley & Sons, Inc., pp. 479-480, 506-507, 510-511, 576-577, 862-865, 1179-1180 and 1552-1553 (2001).
Spatola, Chemistry and Biochemistry of Amino Acids, Peptides and Proteins, 7:267-357, Marcell Dekker, Peptide Backbone Modifications, NY (1983).
Srivastava et al., "Solid Phase Synthesis of Structurally Diverse Pyrimido[4,5-d] Pyrimidines for the Potential Use in Combinatorial Chemistry," *Bioorg. Med. Chem. Lett.*, 9:965-966 (1999).
Tripathi et al., "Reaction of Flavanones with Chlorosulphonyl Isocyanate," Indian J. Chem. Sect. B, 26B:1082-1083 (1987).
Trivedi and Bruns, "C2,$N^6$- Distributed Adenosines: Synthesis and Structure-Activity Relationships," *Journal of Medicinal Chemistry*, 32(8):1667-1673 (1989).
Uehling et al., "Biarylaniline Phenethanolamines as Potent and Selective β33 Adrenergic Receptor Agonists," J. Med. Chem. 49:2758-2771 (2006).
Verma, R. K. et al., "Osmotically Controlled Oral Drug Delivery," Drug Development and Industrial Pharmacy, 26(7):695-708 (2000).
Verschoyle et al., "Pharmacokinetics of Isotretinoin (ISO) in Rats Following Oral Dosing or Aerosol Inhalation," British J. Cancer 80, Suppl. 2:96 Abstract No. p. 269 (1999).
Vippagunta, S. R. et al., "Crystalline solids," Advanced Drug Delivery Reviews, 48:3-26 (2001).
Wilson, "Traceless Solid-Phase Synthesis of 2,4-Diaminoquinazolines," Org. Lett. 3:585-588 (2000).
Winkler et al., "Synthesis and microbial transformation of β-amino nitriles," Tetrahedron 61:4249-4260 (2005).
Wright, "The Synthesis of 2,1,3-Benzothiadiazine 2,2-Dioxides and 1,2,3-Benzoxathiazine 2,2-Dioxides," *Journal of Organic Chemistry* 30(11):3960-3962 (1965).
Xu, L. et al., "Purine and Pyrimidine Nucleotides Inhibit a Noninactivating K+ Current and Depolarize Adrenal Cortical Cells through a G Protein-Coupled Receptor," Molecular Pharmacology, 55:364-376 (1999).
Yoshizawa et al., "Efficient solvent-free Thrope reaction," Green Chem. 4:68-70 (2002).
Zunsain, P. A. et al., "Search for the pharmacophore in prazosin for Transport-P," Bioorganic & Medicinal Chemistry, 13:3681-3689 (2005).

* cited by examiner

US 8,609,173 B2

COMPOSITIONS COMPRISING SWEETNESS ENHANCERS AND METHODS OF MAKING THEM

CROSS-REFERENCE TO RELATED APPLICATION

This application is a U.S. National Stage application of International Application Number PCT/US2009/052258, filed Jul. 30, 2009, which claims the benefit of U.S. Provisional Application No. 61/085,228, filed Jul. 31, 2008 and entitled "COMPOSITIONS COMPRISING SWEETNESS ENHANCERS AND METHODS OF MAKING THEM", the disclosures of which are herein incorporated by reference in their entirety for all purposes.

FIELD OF THE INVENTION

This invention relates to solid and liquid compositions comprising 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, or salts, and/or solvates thereof, and optionally, one of more sweeteners, methods of making such compositions, and methods of making, e.g. ingestible products comprising such compositions.

BACKGROUND OF THE INVENTION

Low calorie or diabetic foods can be prepared by replacing some or all of the natural sweetener (e.g., sucrose, fructose, corn syrup, etc.) with low calorie sweeteners such as saccharin, aspartame, or acesulfame potassium. However, artificial sweeteners such as saccharin and acesulfame potassium can have bitter and/or metallic aftertastes, and high intensity sweeteners such as sucralose and aspartame, although providing a level of sweetness similar to sugar without bitter or metallic aftertastes, can have "sweetness delivery" problems, e.g., different rates and time periods for the onset and linger of the sweet taste. As a result, it is difficult to formulate low calorie diabetic foods with reduced natural sweetener levels, having the same sweetness characteristics as "regular" non-dietetic products sweetened with e.g., sucrose and/or fructose.

Sweetness enhancers (for example those described in U.S. application Ser. Nos. 11/760,592, 11/836,074, 61/027,410, and International Application No. PCT/US2008/065650) are compounds which enhance the perceived sweetness of various natural and artificial sweeteners. Thus, low calorie foods containing sweetness enhancers can be formulated with acceptable sweetness characteristics, yet significantly lower levels of sweeteners. However, formulating foods containing sweetness enhancers can be challenging, due to the high potency and/or low solubility of some sweetness enhancers. For example, highly potent sweetness enhancers require precise and uniform mixing of low levels of the sweetness enhancer in the food to avoid batch-to-batch variability in the perceived sweetness of the food. Accordingly, low solubility sweetness enhancers may require special processing methods to permit formulation of reduced/low calorie foods in a commercially acceptable manner.

The present invention is directed to improved compositions comprising sweetness enhancers, and methods for preparing such compositions.

SUMMARY OF THE INVENTION

In one embodiment, the present invention is directed to a composition comprising a plurality of solid particles, each particle comprising a sweetness enhancer, wherein the sweetness enhancer is 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, or salts and/or solvates thereof.

In another embodiment, the present invention is directed to a solution or suspension comprising a sweetness enhancer, wherein the sweetness enhancer is 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, or salts and/or solvates thereof; and at least one food grade solvent.

In another embodiment, the present invention is directed to a composition comprising a plurality of solid particles, each particle comprising a sweetness enhancer, wherein the sweetness enhancer is 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, or salts and/or solvates thereof prepared by spray drying, precipitation, crystallization, or spin band entrapment.

In another embodiment, the present invention is directed to a solution or suspension comprising a sweetness enhancer, wherein the sweetness enhancer is 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, or salts and/or solvates thereof prepared by spray drying, precipitation, crystallization, or spin band entrapment.

In another embodiment, the present invention is directed to an ingestible composition comprising a plurality of solid particles, each particle comprising a sweetness enhancer, wherein the sweetness enhancer is 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, or salts and/or solvates thereof in combination with at least one edible ingredient.

In another embodiment, the present invention is directed to a method of making a composition comprising a plurality of solid particles, each particle comprising a sweetness enhancer, wherein the sweetness enhancer is 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, or salts and/or solvates said method comprising spray drying a solution comprising 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, or salts and/or solvates thereof, and a solvent.

In another embodiment, the present invention is directed to a method of making an ingestible composition said method comprising combining solid particles of a sweetness enhancer, wherein the sweetness enhancer is 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, or salts and/or solvates with at least one edible ingredient.

In another embodiment, the present invention is directed to a method of making an ingestible composition said method comprising combining a solution or suspension of a sweetness enhancer, wherein the sweetness enhancer is 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, or salts and/or solvates thereof with at least one edible ingredient.

In another embodiment, the present invention is directed to a method of reducing the amount of sweetener in a sweetener-containing ingestible composition, comprising replacing the sweetener in the sweetener-containing ingestible composition with an effective amount of sweetener and a composition comprising solid particles of a sweetness enhancer, wherein the sweetness enhancer is 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, or salts and/or solvates thereof.

DETAILED DESCRIPTION OF THE INVENTION

Figure 1:
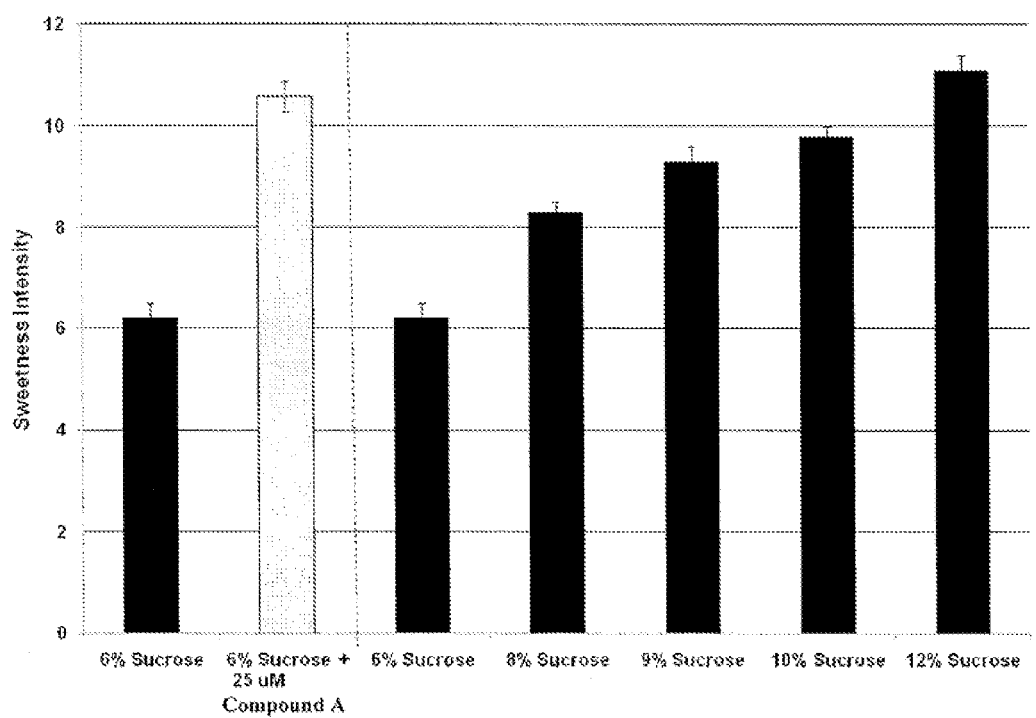
FIG. 1 is a graph showing the sweetness enhancing effect of Compound A for one embodiment of a sweetener.
Figure 2:
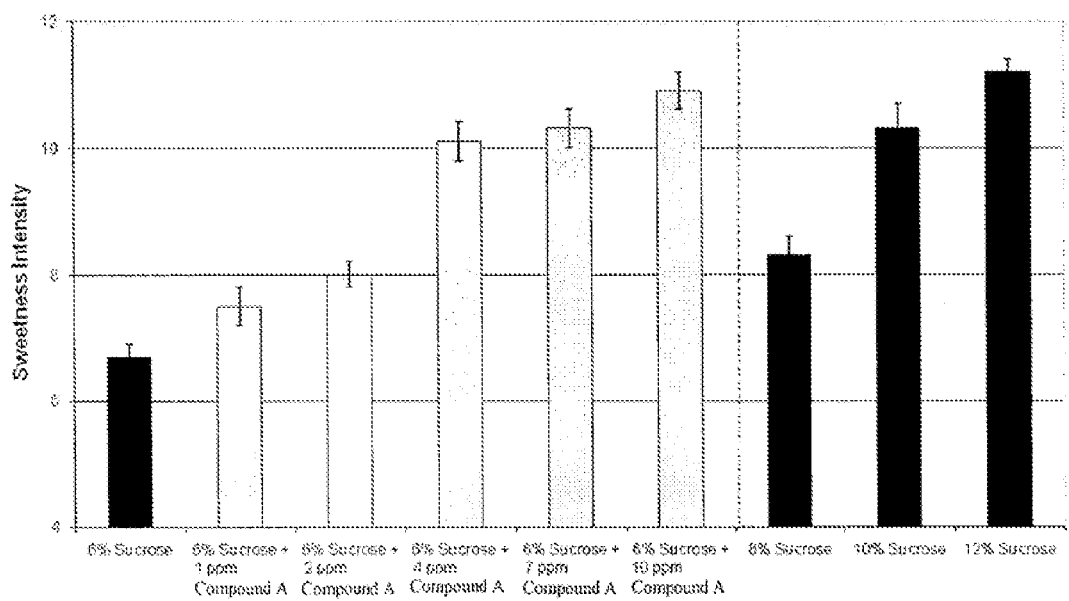
FIG. 2 is a graph showing the sweetness enhancing effect of Compound A for one embodiment of a sweetener when Compound A is at different concentrations.
Figure 3:
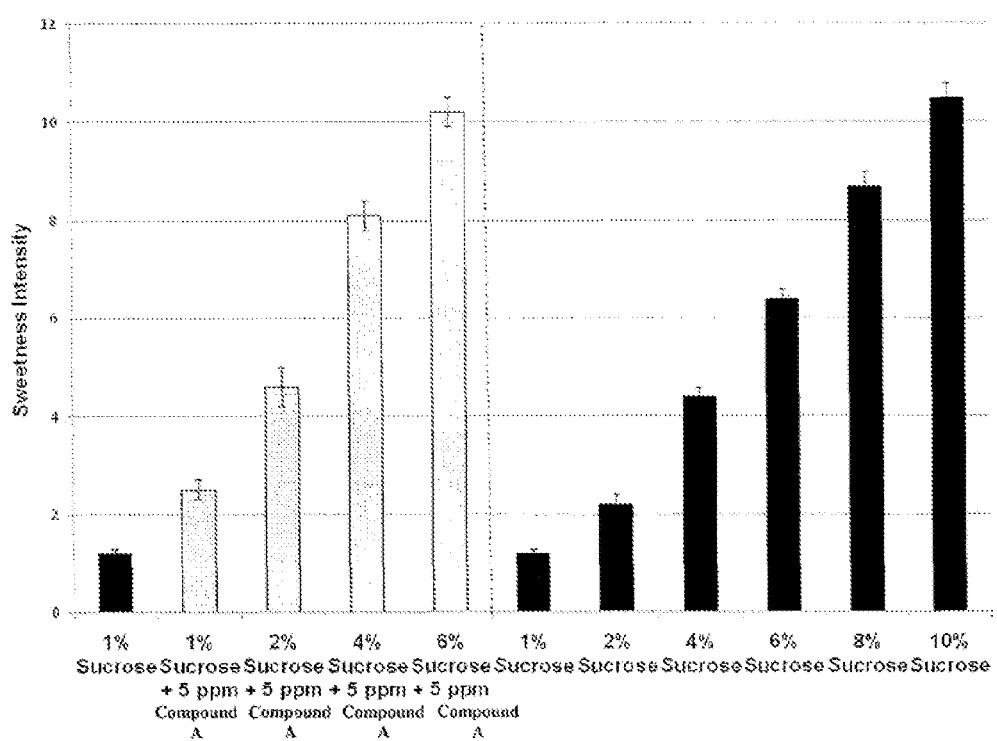
FIG. 3 is a graph showing the sweetness enhancing effect of Compound A when the sweetener is at different concentrations.
Figure 4:
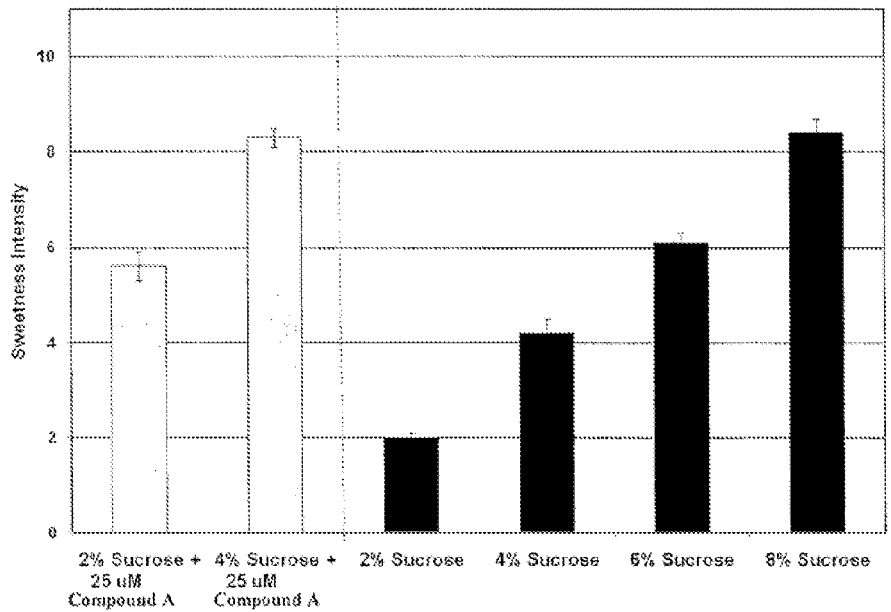
FIG. 4 is a graph showing the sweetness enhancing effect of Compound A for one embodiment of a sweetener when Compound A is at different concentrations.
Figure 5:
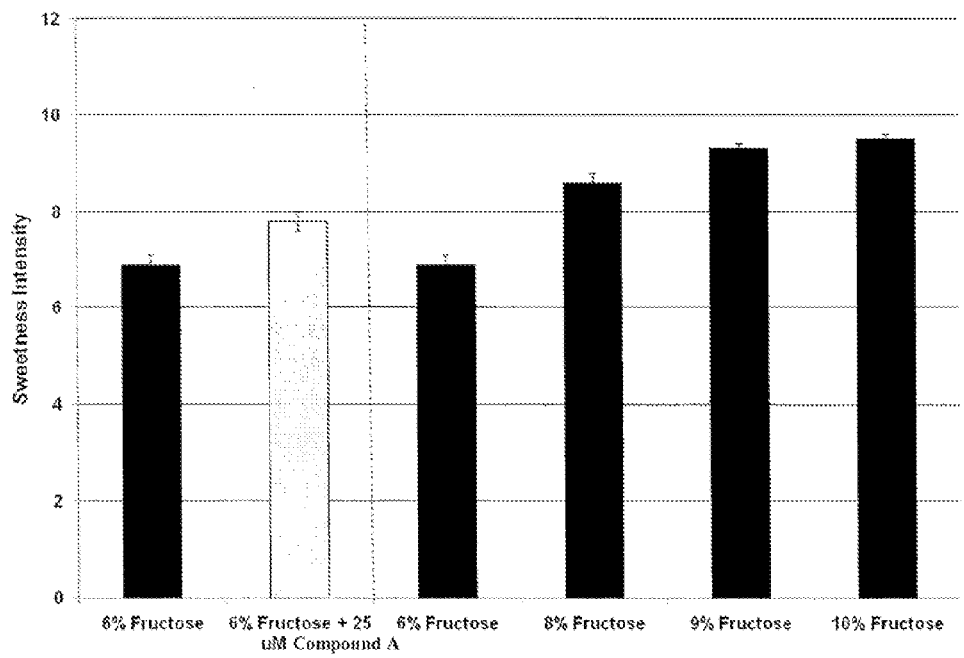
FIG. 5 is a graph showing the sweetness enhancing effect of Compound A for one embodiment of a sweetener.

All documents cited in the present specification are incorporated by reference in their entirety for all purposes.

In one embodiment, the compositions of the present invention comprise solid particles of a sweetness enhancer wherein the sweetness enhancer is 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, or salts and/or solvates thereof. In some embodiments, the compositions of the present invention comprise a plurality of particles (e.g., crystalline or amorphous particles, granulates, nanoparticles, etc.).

The compositions of the present invention can also comprise liquid compositions comprising a solution or suspension of a sweetness enhancer wherein the sweetness enhancer is 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, or salts and/or solvates thereof and a food grade solvent.

In one embodiment, the compositions of the present invention are dissolved or suspended in a food grade alkylene glycol or food grade alcohol. In another embodiment the food grade solvent comprises a flavoring and/or an acid and optionally, a colorant.

In the various embodiments of the present invention, the term "sweetness enhancer" means 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, which respectively have the following structures:

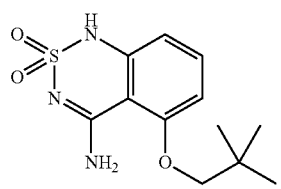

(I)

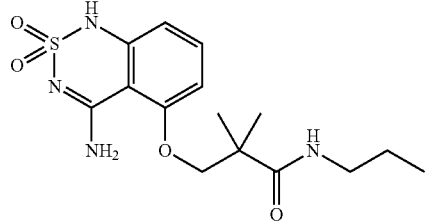

(II)

or salts and/or solvates thereof. Throughout the present application, the term "sweetness enhancer" refers to the specific sweetness enhancers 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide and includes the "parent" compound (e.g., as shown above), as well as salts and/or solvates thereof, unless expressly indicated otherwise.

5-(Neopentyloxy)-1H-benzo[c][1,2,6]thiadiazin-4-amino-2,2-dioxide and 3-(4-amino-2,2-dioxide-1N-benzo[c][1,2,6]thiadiazin-5-yloxy)-2',2'-dimethyl-N-propylpropanamide are relatively acidic compounds, so salt(s) of 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide generally refers to the product formed by the reaction of 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide with a suitable base, for example an alkali metal or alkaline earth hydroxide, carbonate, or bicarbonate. For example, suitable bases include NaOH, $Na_2CO_3$, $NaHCO_3$, $Na_2O$, KOH, $K_2CO_3$, $KHCO_3$, $K_2O$, $Ca(OH)_2$, $CaCO_3$, $Ca(HCO_3)_2$, CaO, $Mg(OH)_2$, $MgCO_3$, $Mg(HCO_3)_2$, MgO, etc. In one embodiment of the compositions of the present invention, 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide are present in the form of $Na^+$ or $K^+$ salts. In other embodiments, 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide are present as the "parent" compound.

Salt(s) of 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide may also be formed by the reaction of a suitable inorganic or organic acid. Suitable acids include those having sufficient acidity to form a stable salt, for example acids with low toxicity, such as the salts approved for use in humans or animals. Non-limiting examples of acids which may be used to form salts of 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide include inorganic acids, e.g., HF, HCl, HBr, $H_1$, $H_2SO_4$, $H_3PO_4$; non-limiting examples of organic acids include organic sulfonic acids, such as $C_{6-16}$ aryl sulfonic acids, $C_{6-16}$ heteroaryl sulfonic acids or $C_{1-16}$ alkyl sulfonic acids—e.g., phenyl, α-naphthyl, β-naphthyl, (S)-camphor, methyl, ethyl, n-propyl, i-propyl, n-butyl, s-butyl, i-butyl, t-butyl, pentyl and hexyl sulfonic acids; non-limiting examples of organic acids includes carboxylic acids such as $C_{1-16}$ alkyl, $C_{6-16}$ aryl carboxylic acids and $C_{4-16}$ heteroaryl carboxylic acids, e.g., acetic, glycolic, lactic, pyruvic, malonic, glutaric, tartaric, citric, fumaric, succinic, malic, maleic, hydroxymaleic, benzoic, hydroxybenzoic, phenylacetic, cinnamic, salicylic and 2-phenoxybenzoic acids; non-limiting examples of organic acids include amino acids, e.g. the naturally-occurring amino acids, lysine, arginine, glutamic acid, glycine, serine, threonine, alanine, isoleucine, leucine, etc. Other suitable salts can be found in, e.g., S. M. Birge et al., J. Pharm. Sci., 1977, 66, pp. 1-19 (herein incorporated by reference for all purposes). In one embodiment, salts of 5-(neopentyloxy)-1H-benzo[c][1,2,6]thiadiazin-4-amino-2,2-dioxide or 3-(4-amino-2,2-dioxide-1H-benzo[c][1,2,6] thiadiazin-5-yloxy)-2',2'-dimethyl-N-propylpropanamide refers to salts which are biologically compatible or pharmaceutically acceptable or non-toxic, particularly for mammalian cells. In a particular embodiment, a suitable salt is the sodium salt of 5-(neopentyloxy)-1H-benzo[c][1,2,6]thiadiazin-4-amino-2,2-dioxide or the sodium salt of 3-(4-amino-2,2-dioxide-1H-benzo[c][1,2,6]thiadiazin-5-yloxy)-2',2'-dimethyl-N-propylpropanamide.

The salts of 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide can be prepared as discussed above, and isolated as the pure or nearly pure, solid salt. Alternatively, the salt can be formed in-situ by adding the parent compound (i.e., 5-(neopentyloxy)-1H-benzo[c][1,2,6]thiadiazin-4-amino-2,2-dioxide or 3-(4-amino-2,2-dioxide-1H-benzo[c] [1,2,6]thiadiazin-5-yloxy)-2',2'-dimethyl-N-propylpropanamide) to a solution containing an appropriate base (e.g., $NaHCO_3$), whereby the e.g. respective $Na^+$ salt is formed in solution. The resulting solution of the salt can then be incorporated directly into an ingestible composition (e.g. a food) as discussed herein. If the ingestible composition includes a basic ingredient, 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide can be added or dissolved into the basic ingredient, forming a salt in-situ which can then be mixed with the other ingredients to form the final ingestible composition, or to form an intermediate composition incorporated into the ultimate ingestible composition.

The salts of invention compounds may be crystalline or amorphous, or mixtures of different crystalline forms and/or mixtures of crystalline and amorphous forms.

Solvates of 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide refers to solid forms of 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide in which one or more solvent molecules, for example water, are complexed to the 5-(neopentyloxy)-1H-benzo[c][1,2,6]thiadiazin-4-amino-2,2-dioxide or 3-(4-amino-2,2-dioxide-1H-benzo[c][1,2,6] thiadiazin-5-yloxy)-2',2'-propylpropanamide. Salts of 5-(neopentyloxy)-1H-benzo[c][1,2,6]thiadiazin-4-amino-2,2-dioxide or 3-(4-amino-2,2-dioxide-1H-benzo[c][1,2,6] thiadiazin-5-yloxy)-2',2'-dimethyl-N-propylpropanamide can also be solvates if the solid form of the respective salts includes one or more solvent molecules.

In some embodiments, the solid compositions of the present invention can consist of primarily or exclusively particles of a sweetness enhancer or salts and/or solvates thereof. In other embodiments, the solid compositions of the present invention can comprise a sweetness enhancer in combination with one or more sweeteners, and optionally, one or more carriers.

"Sweeteners" include, but are not limited to the common saccharide sweeteners, e.g., sucrose, fructose (e.g., D-fructose), glucose (e.g., D-glucose), and sweetener compositions comprising natural sugars, such as corn syrup (including high fructose corn syrup) or other syrups or sweetener concentrates derived from natural fruit and vegetable sources, semi-synthetic "sugar alcohol" sweeteners such as erythritol, isomalt, lactitol, mannitol, sorbitol, xylitol, maltodextrin, glycerol, threitol, arabitol, ribitol, dulcitol, and the like, and artificial sweeteners such as miraculin, aspartame, superaspartame, saccharin, saccharin-sodium salt, acesulfame-K, cyclamate, sodium cyclamate, and alitame. Sweeteners also include trehalose, melizitose, melibiose, raffinose, palatinose, lactulose, cyclamic acid, mogroside, tagatose (e.g., D-tagatose), maltose, galactose (e.g., D-galactose), L-rhamnose, D-sorbose, mannose (e.g., D-mannose), lactose, L-arabinose, D-ribose, D-glyceraldehyde, curculin, brazzein, mogroside, Neohesperidin dihydrochalcone (NHDC), neotame and other aspartame derivatives, D-tryptophan, D-leucine, D-threonine, glycine, D-asparagine, D-phenylalanine, L-proline, maltitol, hydrogenated glucose syrup (HGS), magap, sucralose, lugduname, sucrononate, sucrooctate, monatin, phyllodulcin, hydrogenated starch hydrolyzate (HSH), stevioside, rebaudioside A and other sweet Stevia-based glycosides, lo han guo, thaumatin, monellin, carrelame and other guanidine-based sweeteners, etc. The term "sweeteners" also includes combinations of sweeteners as disclosed herein.

Sweeteners can be classified as "high-intensity sweeteners" or "high potency sweeteners" such as saccharin, aspartame, cyclamate, sucralose, saccharine, stevia, rebaudioside A, neotame, acesulfame K, etc.; or as "carbohydrate" sweeteners such as sucrose, glucose, fructose, sorbitol, etc.

The sweetness enhancers described herein can be combined with any one of the sweeteners described herein, or any combination of these sweeteners, either in a "masterbatch" or intermediate composition useful for preparing an ingestible composition, or in the ultimate ingestible or comestible composition. In specific embodiments, the sweetness enhancer(s) are combined with one or more of sucrose, fructose, or sucralose.

In some embodiments, the solid combination of a sweetener and a sweetness enhancer can be a simple mixture of particles of the sweetness enhancer with particles of the sweetener (and optionally particles of other components), or each particle can comprise both sweetener and sweetness enhancer (and other optional ingredients), or can be in the form of granules which are aggregates of primary particles of the sweetener, sweetness enhancer, and other optional ingredients. Such particles can be prepared, e.g., by techniques such as dry blending, granulation, spray drying, precipitation, spin band entrapment, etc.

In other embodiments, sucrose, fructose, or sucralose can be mixed with the sweetness enhancer or salts, and/or solvates thereof, using various techniques, e.g., as described herein.

The compositions of the present invention provide an improved "sweetness delivery profile" when added to edible compositions, compared to otherwise identical compositions sweetened to the same degree of perceived sweetness using, e.g., natural or artificial sweeteners, but without the sweetness enhancer. The improved sweetness delivery profile can include, for example, a shorter sweetness onset and a shorter sweetness lingering period compared to such conventional compositions lacking the sweetness enhancer.

The term "sweetness delivery profile" refers to a distinguishing characteristic of a sweetener which includes both the time period preceding sweetness onset ("onset period"), and the time period during which sweetness lingers ("lingering period").

The term "ingestible composition" includes any substance intended for oral consumption either alone or together with another substance. The ingestible composition includes both "foods" and "non-food products" such as toothpaste, mouthwash, etc.

"Food" or "comestible" herein means any edible product intended for consumption by humans or animals, including solids, semi-solids, or liquids (e.g., beverages).

A variety of classes, subclasses and species of foods are known. Exemplary foods include confectioneries, chocolate confectionery, tablets, countlines, bagged selflines/softlines, boxed assortments, standard boxed assortments, twist wrapped miniatures, seasonal chocolate, chocolate with toys, alfajores, other chocolate confectionery, mints, standard mints, power mints, boiled sweets, pastilles, gums, jellies and chews, toffees, caramels and nougat, medicated confectionery, lollipops, liquorice, other sugar confectionery, gum, chewing gum, sugarized gum, sugar-free gum, functional gum, bubble gum, cough drops, herbs, seeds, spices, bread, packaged/industrial bread, unpackaged/artisanal bread, pastries, cakes, packaged/industrial cakes, unpackaged/artisanal cakes, cookies, chocolate coated biscuits, sandwich biscuits, filled biscuits, savory biscuits and crackers, bread substitutes, breakfast cereals, ready to eat cereals, family breakfast cereals, flakes, muesli, other cereals, children's breakfast cereals, hot cereals, ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yoghurt, artisanal ice cream, dairy products, milk, fresh/pasteurized milk, full fat fresh/pasteurized milk, semi skimmed fresh/pasteurized milk, long-life/uht milk, full fat long life/uht milk, semi skimmed long life/uht milk, fat-free long life/uht milk, goat milk, condensed/evaporated milk, plain condensed/evaporated milk, flavored, functional and other condensed milk, flavored milk drinks, dairy only flavored milk drinks, flavored milk drinks with fruit juice, soy milk, sour milk drinks, fermented dairy drinks, coffee whiteners, powder milk, flavored powder milk drinks, fruit juices, vegetable juices, cream, cheese, processed cheese, spreadable processed cheese, unspreadable processed cheese, unprocessed cheese, spreadable unprocessed cheese, hard cheese, packaged hard cheese, unpackaged hard cheese, yoghurt, plain/natural yoghurt, flavored yoghurt, fruited yoghurt, probiotic yoghurt, drinking yoghurt, regular drinking yoghurt, probiotic drinking yoghurt, chilled and shelf-stable desserts, dairy-based desserts, soy-based desserts, chilled snacks, fromage frais and quark, plain fromage frais and quark, flavored fromage frais and quark, savory fromage frais and quark, sweet and savory snacks, fruit snacks, chips/crisps, extruded cereals and snacks, tortilla/corn chips, popcorn, pretzels, nuts, other sweet and savory snacks, snack bars, granola bars, breakfast bars, energy bars, fruit bars, other snack bars, meal replacement products, slimming products, convalescence drinks, ready meals, canned ready meals, frozen ready meals, dried ready meals, chilled ready meals, dinner mixes, frozen pizza, chilled pizza, soup, canned soup, dehydrated soup, instant soup, chilled soup, hot soup, frozen soup, pasta, canned pasta, dried pasta, chilled/fresh pasta, noodles, plain noodles, instant noodles, cups/bowl instant noodles, pouch instant noodles, chilled noodles, snack noodles, canned food, canned meat and meat products, canned fish/seafood, canned vegetables, canned tomatoes, canned beans, canned fruit, canned ready meals, canned soup, canned pasta, other canned foods, frozen food, frozen processed red meat, frozen processed poultry, frozen processed fish/seafood, frozen processed vegetables, frozen meat substitutes, frozen potatoes, oven baked potato chips, other oven baked potato products, non-oven frozen potatoes, frozen bakery products, frozen desserts, frozen ready meals, frozen pizza, frozen soup, frozen noodles, other frozen food, dried food, dessert mixes, dried ready meals, dehydrated soup, instant soup, dried pasta, plain noodles, instant noodles, cups/bowl instant noodles, pouch instant noodles, chilled food, chilled processed meats, chilled fish/seafood products, chilled processed fish, chilled coated fish, chilled smoked fish, chilled lunch kit, chilled ready meals, chilled pizza, chilled soup, chilled/fresh pasta, chilled noodles, oils and fats, olive oil, vegetable and seed oil, cooking fats, butter, margarine, spreadable oils and fats, functional spreadable oils and fats, sauces, dressings and condiments, tomato pastes and purees, bouillon/stock cubes, stock cubes, gravy granules, liquid stocks and fonds, herbs and spices, fermented sauces, soy based sauces, pasta sauces, wet sauces, dry sauces/powder mixes, ketchup, mayonnaise, regular mayonnaise, mustard, salad dressings, regular salad dressings, low fat salad dressings, vinaigrettes, dips, pickled products, other sauces, dressings and condiments, baby food, milk formula, standard milk formula, follow-on milk formula, toddler milk formula, hypoallergenic milk formula, prepared baby food, dried baby food, other baby food, spreads, jams and preserves, honey, chocolate spreads, nut-based spreads, yeast-based spreads, toppings, and syrups.

In one embodiment, foods include alcoholic beverages, baby food, baby formula, baked goods, breakfast cereals, cheese, chewing gurii, coffee whiteners, condiments and relishes, confectionary and frostings, crackers, dairy products, egg products, fats and oils, fish products, frozen dairy, frozen dinners, fruit ices, gelatins and puddings, grain mixtures, granulated sugar, gravies, hard candy, imitation dairy products, coffee, coffee products and coffee beverages, jams and jellies, meat products, milk products, non-alcoholic beverages, nut products, grains and grain products, poultry, processed fruits, processed vegetables, reconstituted vegetables, ready to eat meals, salad dressings, seasonings and flavors, snack foods, soft candy, soups, sugar substitutes, sweet sauce, sweetener blends, table top sweeteners, tea, tea products, and tea beverages.

In a particular embodiment, foods include table top sweeteners and beverages. Beverages include, but are not limited to, fruit juices, soft drinks, tea, coffee, beverage mixes, milk drinks, alcoholic and non alcoholic beverages.

In another embodiment, a beverage is an acidic beverage. In another embodiment, the beverage is a carbonated beverage having a pH from about 2 to about 5. In yet another embodiment, the beverage is a cola beverage.

According to the present invention, "non-edible products" include supplements, nutraceuticals, functional food products (e.g., any fresh or processed food claimed to have a health-promoting and/or disease-preventing properties beyond the basic nutritional function of supplying nutrients), pharmaceutical and over the counter medications, oral care products such as dentifrices and mouthwashes, cosmetic products such as sweetened lip balms and other personal care products that use sucrose and or other sweeteners.

The term "edible ingredient" herein means any edible component or mixture of components of food or food products, for example the edible ingredients which would typically be found in a recipe for human or animal foods. Edible ingredients include natural and synthetic food components.

In another embodiment, foods include ice creams, breakfast cereals, sweet beverages or solid powders or liquid concentrate compositions for preparing beverages.

In various embodiments, ingestible compositions according to the present invention, comprising at least one edible ingredient, and sweetness enhancer or salts, and/or solvates thereof include baked goods and baking mixes, beverages, alcoholic beverages and beverage mixes, breakfast cereals, cheeses, chewing gum, coffee and tea, condiments and relishes, confections and frostings, dairy product substitutes, fats and oils, frozen dairy desserts and mixes, fruit and water ices, gelatins, puddings, and fillings, gravies and sauces, pet foods, hard candy and cough drops, herbs, seeds, spices, seasonings, blends, extracts, and flavorings, jams and jellies, meat products, milk products, processed fruits and fruit juices, processed vegetables and vegetable juices, snack foods, soft candy, soups and soup mixes, sugar substitutes, sweet sauces, toppings, and syrups, nutritional products & dietary supplements, pharmaceuticals, etc.

In other embodiments, ingestible compositions according to the present invention, comprising at least one edible ingredient, sucrose, and sweetness enhancer or salts, and/or solvates thereof include acidic beverages, carbonated beverages, new age beverages (e.g., beverages typically sweetened with fructose or fruit juice, flavored with natural flavors, and lacking preservatives such as sodium benzoate; for example flavored sparkling waters, natural sodas, and sparkling juice drinks), alcoholic beverages, nutraceutical beverages (e.g., fortified with vitamins, etc.) baby food, baby formula, baked goods, breakfast cereals, cheese, chewing gum, coffee whiteners, condiments & relishes, confectionery & frostings, crackers, dairy products, egg products, fats & oils, fish products, frozen dairy, frozen dinners, fruit ices, gelatins & puddings, grain mixtures, granulated-sugar, gravies, hard candy, imitation dairy products, coffee, coffee products and coffee beverages, jams & jellies, meat products, milk products, non-alcoholic beverages, nut products, grains and grain products, poultry, processed fruits, processed vegetables, reconstituted vegetables, ready to eat meals, salad dressings, seasonings & flavors, snack foods, soft candy, soups, sugar substitutes, sweet sauce, sweetener blends, table top sweeteners, tea, tea products, and tea beverages.

The term "particles" herein means particles that have been formed from a solution or suspension by methods conventional in the art, such as spray drying, spin band entrapment, precipitation, granulation, complexation (e.g., cyclodextrin complexation) and nanoformulation. The particles according to the present invention may be of any size, ranging from nanoparticles (e.g., particles of less than about 1 µm in diameter) to granules (e.g., aggregates of primary particles) having average diameters in the range of about 200 µm to about 1 mm. The particles can be in the form of crystals, or can be amorphous, or a mixture of crystalline an amorphous, as well as combinations of crystalline particles, amorphous particles, granules, nanoparticles, etc.

In one embodiment, the particles have a diameter of from about 0.001 µm to about 500 µm, e.g., about 0.001 µm, about 0.01 µm, about 0.02 µm, about 0.03 µm, about 0.04 µm, about 0.05 µm, about 0.06 µm, about 0.07 µm, about 0.08 µm, about 0.09 µm, about 0.1 µm, about 0.2 µm, about 0.3 µm, about 0.4 µm, about 0.5 µm, about 0.6 µm, about 0.7 µm, about 0.8 µm, about 0.9 µm, about 1 µm, about 2 µm, about 4 µm, about 6 µm, about 8 µm, about 10 µm, about 15 µm, about 20 µm, about 25 µm, about 30 µm, about 35 µm, about 40 µm, about 45 µm, about 50 µm, about 55 µm, about 65 µm, about 70 µm, about 75 µm, about 80 µm, about 85 µm, about 90 µm, about 95 µm, about 100 µm, about 150 µm, about 200 µm, about 250 µm, about 300 µm, about 350 µm, about 400 µm, about 450 µm, about 500 µm, about 550 µm, about 600 µm, about 650 µm, about 700 µm, about 750 µm, about 800 µm, about 850 µm, about 900 µm, about 950 µm, or about 1000 µm, inclusive of all values, ranges, and subranges therebetween.

In another embodiment, particles (e.g., prepared by spray drying) can have substantially rounded shape, wherein about 40% to about 80% of the particles have a diameter of from about 20 µm to about 200 µm. Generally, the particles are within a more tightly controlled specific range whose limits depend upon the particular application for which the composition is intended.

Compositions of the present invention comprise a plurality of particles. The particles of the present invention can have any suitable particle size distribution, for example relatively large particles with a small proportion of small particles. The particle size distribution can be unimodal or multimodal (e.g., the combination of two or more different unimodal particle size distributions.

The particles of the present invention can be essentially spherical, or can have a non-spherical shape defined by a length to diameter (L/D) ratio which is greater than 1. In one embodiment, the particles generally have an L/D ratio in the range 5-10. In other embodiments, the L/D ratio can be about 1. Another useful characteristic is $d_{50}$, the spray droplet diameter that corresponds to the diameter of the droplets that make up 50% of the total liquid volume containing particles of equal or smaller diameter. In one embodiment, the droplets will have a $d_{50}$ between 100 and 1000 µm in size, as determined by a drop-size analyzer. In another embodiment of the invention, the particles have a $d_{40}$ between 400 and 800 µm in size, and are especially useful in dissolution applications. For producing substantially homogenous particles, the inventors have found that $d_{50}$ should be between 100 and 200 PA in size with an L/D ratio of less than 2.0.

The particles of the present invention, as indicated herein, can be prepared e.g., by spray drying a solution or suspension comprising sweetness enhancer, or additionally comprising a sweetener selected from sucrose of fructose, and optionally carriers such as maltodextrin, starches, gum arabic, or other acceptable carriers or fillers known in the art.

Relatively potent sweetness enhancers, such as those of the present invention, must be used at relatively low levels in ingestible compositions (e.g., levels ranging from about 0.1 ppm to about 5000 ppm) in order to provide the desired level of perceived sweetness of the sweetener component (e.g., sucrose, fructose, and or sucralose). Such low levels of sweetness enhancer are difficult to uniformly distribute throughout a composition, since even slight variations in concentration can greatly affect the perceived sweetness of the sweetener. One method for incorporating low levels of a solid into a composition is to prepare a "masterbatch"—e.g., a composition (i.e., either a solid or liquid composition) containing a relatively high concentration of the sweetness enhancer (i.e., higher than the concentration desired in the ultimate ingestible composition). Thus, masterbatches can contain 2-fold to about 100-fold higher concentrations of the sweetness enhancer compared to the concentration of the sweetness enhancer in the ultimate ingestible composition. This masterbatch can then be serially diluted during formulation of the ultimate edible composition to achieve a uniform distribution of the sweetness enhancer at the desired concentration.

In one embodiment, a solid powder "masterbatch" comprising the sweetness enhancer(s) of the present invention can be prepared by spray drying a solution or suspension of the sweetness enhancer in combination with a suitable carrier (e.g., maltodextrins, starches, gum arabic, the sweetener, etc.). In this manner, each particle of the spray dried composition contains essentially identical amounts of the sweetness enhancer, carrier and/or sweetener, and other optional ingredients. By appropriately selected the concentration of enhancer in the "masterbatch", and the amount of masterbatch used, the desired level of sweetness enhancer can be incorporated into the ultimate edible composition.

In other embodiments, a solid powder "masterbatch" can be produced by other methods, such as granulating the sweetness enhancer in the presence of a carrier and/or sweetener (and optionally in the presence of a suitable solvent or binder solution to promote agglomeration of the sweetness enhancer and carrier particles), or simply blending a powdered sweetness enhancer and carrier.

Alternatively, a powder prepared by spray drying a solution or suspension comprising a sweetness enhancer/sweetener/optional carrier can itself can be used as the ultimate edible composition (e.g., as a tabletop sweetener).

In addition, any other suitable method (e.g., spin brand entrapment, co-precipitation, complexation, granulation, powder mixing, etc.) for preparing a solid composition can also be used to prepare solid mixtures comprising the sweetness enhancer and an optional carrier and/or sweetener. For example, the sweetness enhancer can be adsorbed or complexed to a carrier such as a cyclodextrin, mixed into a melt of a suitable carrier (spin band entrapment), mixed with a carrier particle, granulated with a carrier powder in the presence of a solvent or binder solution (e.g., forming granules comprising agglomerates of a carrier and the sweetness enhancer), etc.

In one embodiment of the present invention, spray dried particles, each comprising 5-(neopentyloxy)-1H-benzo[c][1,2,6]thiadiazin-4-amino-2,2-dioxide or 3-(4-amino-2,2-dioxide-1H-benzo[c][1,2,6]thiadiazin-5-yloxy)-2',2'-dimethyl-N-propylpropanamide, or salts, and/or solvates thereof, have improved dissolution characteristics, or provide improved dissolution characteristics to the compositions comprising the particles of the present invention.

In one embodiment of the present invention, spray dried particles, each comprising sucrose and 5-(neopentyloxy)-1H-benzo[c][1,2,6]thiachazin-4-amino-2,2-dioxide or 3-(4-amino-2,2-dioxide-1H-benzo[c][1,2,6]thiadiazin-5-yloxy)-2',2'-dimethyl-N-propylpropanamide, or salts, and/or solvates, thereof have improved dissolution characteristics. For example, such improved dissolution properties can include an increased dissolution rate.

The particles of the present invention may have various densities depending on the intended use. In one embodiment of the present invention, the bulk density of the particles is between 0.25 and 0.75 g/mL. In another embodiment the bulk density of the particles is between 0.25 and 0.5 g/mL. In still other embodiments, the bulk density of the particles is about 0.25, about 0.30, about 0.35, about 0.40, about 0.45, about 0.50, about 0.55, about 0.60, about 0.65, about 0.70, or about 0.75 g/mL, inclusive of all values, ranges, and subranges therebetween.

In another embodiment of the present invention, the particles can have a moisture content between 0.25 and 6.0 wt %. In another embodiment, the particles can have a moisture content between 0.4 and 6.0 wt %. In still another embodiment of the present invention, the particles can have a moisture content between 0.25 and 0.5 wt %. In yet another embodiment of the present invention, the particles can have a moisture content between 0.4 and 0.5 wt %.

The compositions of the present invention comprising a plurality of solid particles, e.g., containing the sweetness enhancers described herein (or salts and/or solvates thereof), or comprising sucrose, fructose, or sucralose in combination with sweetness enhancer or salts, and/or solvates thereof, can contain the sweetness enhancer or salts, and/or solvates at concentrations ranging from about 1 ppm to about 5000 ppm if the composition is intended for use as a tabletop sweetener. If the solid compositions of the present invention are intended for use as intermediates (e.g. as masterbatches) in the formulation of an edible composition, the amount of sweetness enhancer (or salts and/or solvates thereof) can range from about 5 wt. % to about 80 wt. %, including about 5 wt. %, about 10 wt. %, about 15 wt. %, about 20 wt. %, about 25 wt. %, about 30 wt. %, about 35 wt. %, about 40 wt. %, about 45 wt. %, about 50 wt. %, about 55 wt. %, about 60 wt. %, about 65 wt. %, about 70 wt. %, about 75 wt. %, or about 80 wt. %, inclusive of all ranges and subranges therebetween.

In the compositions of the present invention comprising a plurality of solid particles, the weight ratio carrier and/or sweetener to of sweetness enhancer ranges about 2:1 to about 100,000:1, or about 2:1, about 3:1, about 4:1, about 5:1, about 6:1, about 7:1, about 8:1, about 9:1, about 10:1, about 15:1, about 20:1, about 30:1, about 40:1, about 50:1, about 60:1, about 70:1, about 80:1, about 90:1, about 100:1, about 200:1, about 300:1, about 400:1, about 500:1, about 600:1, about 700:1, about 800:1, about 900:1, about 1000:1, about 5000:1, about 10,000:1, about 20,000:1, about 30,000:1, about 40,000:1, about 50,000:1, about 60,000:1, about 70,000:1, about 80,000:1, about 90,000:1, or about 100,000:1, inclusive of all ranges and subranges therebetween.

In one embodiment of the present invention, the sweetness enhancer, 3-(4-amino-2,2-dioxide-1H-benzo[c][1,2,6]thiadiazin-5-yloxy)-2',2'-dimethyl-N-propylpropanamide is present as its sodium salt.

In another embodiment of the present invention, the sweetness enhancer, 5-(neopentyloxy)-1H-benzo[c][1,2,6]thiadiazin-4-amino-2,2-dioxide is present as its sodium salt.

Compositions of the present invention can also comprise a solution or suspension of sweetness enhancer in at least one food grade solvent. Food grade solvents are solvents having a purity, taste properties, color, odor, etc. suitable for use in food. A variety of food grade solvents are known. Exemplary solvents belong to the classes of alkylene glycols, alcohols, oils and flavorings. A nonlimiting list of specific suitable food grade solvents include water, ethyl alcohol, isopropyl alcohol, butylene glycol, glycerol, vegetable oils, olive oil, soy oil, canola oil, cottonseed oil, corn oil, peanut oil, persic oil, cottonseed oil, sesame oil, fractionated coconut oil, synthetic oils such as Neobee (available from Stepan), triacetin, tributyrin, mono and diglycerides, triglycerides, medium chain triglycerides, ethyl lactate, ethyl levulinate, butyl stearate, triethyl citrate, diethyl succinate, diethyl malonate, acetic acid, lactic acid, benzyl alcohol, tetrahydrofurfural alcohol, D-limonene, γ-valerolactone, butyrolactone, polyethylene glycol, polypropylene glycol, sorbitan monostearate, or combinations thereof.

In one embodiment, the food grade alcohol is ethanol. In a particular embodiment the composition of the present invention comprising 5-(neopentyloxy)-1H-benzo[c][1,2,6]thiadiazin-4-amino-2,2-dioxide is suspended or dissolved in ethanol.

In another embodiment, the food grade alkylene glycol is propylene glycol. In a particular embodiment the composition of the present invention comprises dissolving or suspending 3-(4-amino-2,2-dioxide-1H-benzo[c][1,2,6]thiadiazin-5-yloxy)-2',2'-dimethyl-N-propylpropanamide in propylene glycol.

In still another embodiment, the food grade solvent comprises a liquid flavorings such as lemon oil, lime oil, orange oil, clove oil, vanilla extract, cola flavor, combinations thereof, etc.

In another embodiment, the food grade solvent comprises an aqueous acid and optionally a colorant.

For liquid compositions of the present invention, the weight ratio of sweetness enhancer:food grade solvent is about 1:2 to about 1:100,000, for example about 1:2, about 1:3, about 1:4, about 1:5, about 1:6, about 1:7, about 1:8, about 1:9, about 1:10, about 1:15, about 1:20, about 1:25, about 1:30, about 1:35, about 1:40, about 1:45, about 1:50, about 1:55, about 1:60, about 1:65, about 1:70, about 1:75, about 1:80, about 1:85, about 1:90, about 1:95, about 1:100, about 1:150, about 1:200, about 1:250, about 1:300, about 1:350, about 1:400, about 1:450, about 1:500, about 1:550, about 1:600, about 1:650, about 1:700, about 1:750, about 1:800, about 1:850, about 1:900, about 1:950, about 1:1000, about 1:2000, about 1:3000, about 1:4000, about 1:5000, about 1:6000: about 1:7000, about 1:8000, about 1:9000, about 1:10,000, about 1:20,000, about 1:30,000, about 1:40,000, 1:50,000, 1:60,000, 1:70,000, 1:80,000, 1:90,000, or 1:100,000, inclusive of all ranges and subranges therebetween.

The liquid compositions of the present invention can be true solutions of the sweetness enhancer in the food grade solvent, or can be suspensions of particles of the sweetness enhancer in the food grade solvent. The sweetness enhancer can also be partially dissolved and suspended in the food grade solvent. The liquid compositions may additionally include other components such as sweeteners, flavors, coloring agents, etc.

The sweetness enhancers of the present invention are useful for modulating (enhancing or modifying the sweetness characteristics) the sweet taste or other taste properties of the sweeteners provided individually, or in combination with any food product. By adding increasing amounts of the sweetness enhancers disclosed herein to an edible composition or food, sweetener levels can be reduced while maintaining or enhancing the sweetness profile of the ingestible composition or food (e.g., comestible) without affecting the taste. Hence in one embodiment of the invention, the amount of sucrose, fructose, or sucralose in a food product can be reduced, or the sweetness characteristics improved, while maintaining the characteristic sweetness levels and characteristics of the food by adding a sweetness enhancer.

Alternatively, in some situations it may be desirable to increase the perceived sweetness of the ingestible composition or food product. Thus, in another embodiment, the amount of sweetener (e.g. sucrose, fructose, or sucralose) can be replaced with a sweetness enhancer in combination with the same amount, or a reduced amount of sweetener, thereby providing ingestible composition or food product with an increased level of perceived sweetness.

The compositions of the present invention comprising sweetness enhancers can provide improved flavor characteristics. Accordingly, the sweetness enhancers of the present invention can be formulated into an ingestible composition (e.g. a food) as a means of improving the flavor, particularly the flavor of the sweetener in the ingestible composition. Improved flavor can include improving our enhancing the sweetness characteristics of the food (e.g. as described below) or can effectively remove negative flavor characteristics and/or enhance sweetness.

It is recognized that the concentration of the sweetness enhancer needed to improve the flavor of a food product will depend on many variables, including the specific type of food and its other ingredients, especially the presence of other known sweet flavoring agents, the genetic variability and individual preferences and health conditions of those tasting the compositions, and the subjective effect of the particular compound on the taste of such chemosensory compounds. In one embodiment, the amount by weight of sweetness enhancer ranges from about 0.001 ppm to about 5000 ppm of the food product. In another embodiment, the amount ranges from about 0.1 ppm to about 10 ppm of the food product. In still other embodiments, the amount by weight of sweetness enhancer in a food product is about 0.001 ppm, about 0.01 ppm, about 0.1 ppm, about 1 ppm, about 2 ppm, about 3 ppm, about 4 ppm, about 5 ppm, about 6 ppm, about 7 ppm, about 8 ppm, about 9 ppm, about 10 ppm, about 11 ppm, about 12 ppm, about 13 ppm, about 14 ppm, about 15 ppm, about 16 ppm, about 17 ppm, about 18 ppm, about 19 ppm, about 20 ppm, about 25 ppm, about 30 ppm, about 35 ppm, about 40 ppm, about 45 ppm, about 50 ppm, about 55 ppm, about 60 ppm, about 75 ppm, about 90 ppm, about a hundred ppm, about 125 ppm, about 150 ppm, about 175 ppm, about 200 ppm, about 250 ppm, about 300 ppm, about 350 ppm, about 400 ppm, about 450 ppm, about 500 ppm, about 600 ppm, about 700 ppm, about 800 ppm, about 900 ppm, about 1000 ppm, about 1500 ppm, about 2000 ppm, about 2500 ppm, about 3000 ppm, about 3500 ppm, about 4000 ppm, about 4500 ppm, or about 5000 ppm, inclusive of all values, ranges, and subranges therebetween.

The amount of the sweetness enhancer in an ingestible composition depends upon the organoleptic properties desired (e.g. sweetness properties). In one embodiment, the ingestible composition is a beverage powder comprising about 5-50 ppm of the sweetness enhancer, for example about 5 ppm, about 10 ppm, about 15 ppm, about 20 ppm, about 25 ppm, about 30 ppm, about 35 ppm, about 40 ppm, or about 50 ppm of the sweetness enhancer, inclusive of all values, ranges and subranges therebetween. In another embodiment, the ingestible composition is cereal, such as a frosted flake cereal, comprising about 5-50 ppm of the sweetness enhancer, for example about 5 ppm, about 10 ppm, about 15 ppm, about 20 ppm, about 25 ppm, about 30 ppm, about 35 ppm, about 40 ppm, or about 50 ppm of the sweetness enhancer, inclusive of all values, ranges and subranges therebetween. In a particular embodiment the ingestible composition is a carbonated beverage such as cola beverage, comprising about 400 ppb to about 10 ppm of a sweetness enhancer, including about 400 ppb, about 1 ppm, about 2 ppm, about 3 ppm, about 4 ppm, about 5 ppm, about 6 ppm, about 7 ppm, about 8 ppm, about 9 ppm, or about 10 ppm of the sweetness enhancer, inclusive of all values, ranges and subranges therebetween. In still another embodiment, the ingestible composition is a yogurt, comprising about 500 ppb to about 10 ppm of a sweetness enhancer, including about 500 ppb, about 1 ppm, about 2 ppm, about 3 ppm, about 4 ppm, about 5 ppm, about 6 ppm, about 7 ppm, about 8 ppm, about 9 ppm, or about 10 ppm of the sweetness enhancer, inclusive of all values, ranges and subranges therebetween. In still another embodiment, the ingestible composition is a flavored water comprising about 500 ppb to about 5 ppm of a sweetness enhancer, including about 500 ppb, about 1 ppm, about 1.5 ppm, about 2.0 ppm, about 2.5 ppm, about 3.0 ppm, about 3.5 ppm, about 4.0 ppm, about 4.5 ppm, or about 5.0 ppm, inclusive of all values, ranges and subranges therebetween.

The amount of sweetness enhancer in the composition, or in combination with a food product, can be measured in relation to the amount of sweetener (e.g., sucrose, fructose, or sucralose) present in the composition or the food product. In one embodiment, the sweetness enhancer:sweetener weight ratio is from about 1:5,000,000 to about 1:2, for example about 1:2, about 1:3, about 1:4, about 1:5, about 1:6, about 1:7, about 1:8, about 1:9, about 1:10, about 1:15, about 1:20, about 1:25, about 1:30, about 1:35, about 1:40, about 1:45, about 1:50, about 1:55, about 1:60, about 1:65, about 1:70, about 1.75, about 1:80, about 1:85, about 1:90, about 1:95, about 1:100, about 1:200, about 1:300, about 1:400, about 1:500, about 1:600, about 1:700, about 1:800, about 1:900, about 1:1000, about 1:2000, about 1:3000, about 1:4000, about 1:5000, about 1:6000, about 1:7000, about 1:8000, about 1:9000, about 1:10,000, about 1:20,000, about 1:30,000, about 1:40,000, about 1:50,000, about 1:60,000, about 1:70,000, about 1:80,000, about 1:90,000, about 1:100,000, about 1:200,000, about 1:300,000, about 1:400,000, about 1:500,000, about 1:600,000, about 1:700,000, about 1:800,000, about 1:900,000, about 1:1,000,000, about 1:2,000,000, about 1:3,000,000, about 1:4,000,000, or about 1:5,000,000, inclusive of all values, ranges, and subranges therebetween.

Foods or ingestible compositions comprising sweetness enhancer, or salts, and/or solvates thereof and sucrose, have an improved sweetness delivery profile. In one embodiment, the improvement comprises reducing the sweetness "onset period" of the sweetness delivery profile of the sweetener. In another embodiment, the improvement comprises reducing the "lingering period" of the sweetness delivery profile of the sweetener. In yet another embodiment, the improvement comprises reducing both the "onset period" and the "lingering period" of the sweetness delivery profile of a sweetener.

In one embodiment the ingestible composition comprises 5-(neopentyloxy)-1H-benzo[c][1,2,6]thiadiazin-4-amino-2,2-dioxide or salts thereof. In another embodiment, the ingestible composition comprises 3-(4-amino-2,2-dioxide-1H-benzo[c][1,2,6]thiadiazin-5-yloxy)-2',2'-dimethyl-N-propylpropanamide or salt thereof.

For an ingestible composition such as a beverage powder (e.g., a chocolate beverage powder), the amount of natural sweetener (e.g. sucrose or fructose) is typically about 70-85 wt. %. By adding a sweetness enhancer (e.g. 5-15 ppm), the amount of natural sweetener in the beverage powder can be reduced by about 40-60 wt. %, for example about 50 wt. %, yet retain essentially the same sweetness characteristics as the fully sweetened form of a beverage powder. In some embodiments, the amount of natural sweetener in the beverage powder can be reduced still further by replacing some or all of the natural sweetener with an artificial sweetener, e.g. sucralose.

In one embodiment, the amount of natural sweetener in a beverage powder composition comprising a sweetness enhancer is the range of about 55 wt. % to about 80 wt. %, about 60 wt. % to about 75 wt. %, about 65 wt. % to about 70 wt. %, or about 60 wt. % to about 65 wt. % of the total weight of the beverage powder. The amount of flavor (e.g. cocoa, vanillin, etc.) is in the weight range of about 15 wt. % to about 40 wt. %, about 20 wt. % to about 35 wt. %, about 25 wt. % to about 30 wt. % of the total weight of the ingestible composition. In a particular embodiment, a beverage powder comprises from about 55 wt. % to about 80 wt. % of sweetener (e.g., sucrose), about 15 wt. % to about 40 wt. % of flavor, and about 5 ppm to about 10 ppm of a sweetness enhancer.

For an ingestible composition such as a cereal (e.g., frosted corn flakes), the amount of natural sweetener is typically in the range of about 30 wt. % to about 50 wt. %, or about 35 wt. % to about 45 wt. % of the total weight of the cereal (dry weight basis). By adding a sweetness enhancer (e.g., about 2 ppm to about 22 ppm, or about 0.1 to about 0.5 wt %), the amount of natural sweetener in the cereal can be reduced by about 20 to 60 wt. %., for example about 40 to 60 wt %, or about 50 wt. %, yet retain essentially the same sweetness characteristics as the fully sweetened form of the cereal. In some embodiments, the amount of natural sweetener in the cereal can be reduced still further by replacing some or all of the natural sweetener with an artificial sweetener, e.g. sucralose.

In one embodiment, the amount of natural sweetener in a cereal comprising sweetness enhancer is in the range of about 20 wt. % to about 30 wt. %, about 20 wt. % to about 25 wt. %, or about 25 wt. % of the total weight of the ingestible composition. In a particular embodiment, the frosted flakes cereal comprises from about 70 wt. % to about 75 wt. % of corn flakes, about 22 wt. % to about 26 wt. % of sweetener (e.g., sucrose), and about 5 to 22 ppm of a sweetness enhancer, or alternatively about 0.3 to about 0.4 wt. %.

For an ingestible composition such as a carbonated beverage (e.g., a cola beverage), the amount of natural sweetener is typically in the range of about 5 wt. % to about 15 wt. %, or about 10 wt. %. By adding a sweetness enhancer (e.g. about 1 ppm to about 22 ppm) the amount of natural sweetener in a carbonated beverage can be reduced by about 25-60 wt. %, for example about 30 wt. %, yet retain essentially the same sweetness characteristics as the naturally sweetened form of the carbonated beverage. In some embodiments, the amount of natural sweetener in the carbonated beverage can be reduced still further by replacing some or all of the natural sweetener with an artificial sweetener, e.g. sucralose.

In one embodiment, the carbonated beverage (e.g., a cola beverage) comprising a sweetness enhancer contains in the range of about 80 wt. % to about 90 wt. % of carbonated water, about 80 wt. % to about 85 wt. % of carbonated water, or about 85 wt. % of carbonated water. The amount of a flavoring in the carbonated beverage ranges from about 0.2 to about 5.0 wt. %. The amount of sweetener (e.g., sucrose) in the carbonated beverage is in the range of about 2 wt. % to about 10 wt. %, about 4 wt. % to about 8 wt. %, or about 6 wt. % of the total weight of the carbonated beverage. In a particular embodiment, a cola beverage comprises from about 80 wt. % to about 85 wt. % of soda water, from about 8 wt. % to about 12 wt. % of sucrose, about 0.1 wt. % to about 1 wt. % of flavoring, and about 2 ppm to about 22 ppm of the sweetness enhancer.

For an ingestible composition such as a flavored water, the amount of natural sweetener is typically in the range of about 5 wt. % to about 15 wt. %, about 7 wt. % to about 11 wt. %, or about 9 wt. %. By adding a sweetness enhancer (e.g. about 1 to 22 ppm) the amount of natural sweetener (e.g. sucrose) in the flavored water can be reduced by about 25 to 60 wt. %, for example about 30 wt. %, yet retain essentially the same sweetness characteristics of the naturally sweetened form of the flavored water. In some embodiments, the amount of natural sweetener in the flavored water can be reduced still further by replacing some or all of the natural sweetener with an artificial sweetener, e.g. sucralose.

In one embodiment, the sweetened water comprising a sweetness enhancer contains in the range of about 5-7 wt/%, or about 6 wt. % of a natural sweetener (e.g. sucrose). The amount of flavoring ranges from about 0.1 to about 2.0 wt. % or from about 0.1 to about 2.0 wt. %, with water comprising essentially all of the remaining weight of the composition.

For an ingestible composition such as a fruit-flavored yogurt, the amount of natural sweetener in the fruit portion of the yogurt can be reduced by the addition of a sweetness enhancer. For example, a strawberry fruit flavoring for yogurt can comprise about 25-35 wt. % of strawberries (i.e., in the form of a dice and/or pulp) and about 5-10 wt. % of a natural sweetener (e.g., sucrose), as well as small amounts of additional flavors, stabilizers, etc. By adding about 1 to 22 ppm of a sweetness enhancer, the amount of natural sweetener can be reduced by about 25-60 wt. %, for example about 30 wt. %, yet retain essentially the same sweetness characteristics of the naturally sweetened form of a strawberry flavoring. In some embodiments, the amount of natural sweetener can be reduced still further by replacing some or all of the natural sweetener with an artificial sweetener, e.g. sucralose. The skilled artisan will recognize that other fruit flavorings could be employed, and the amount of sweetness enhancer and the reduced level of natural sweeteners would be adjusted as needed depending upon the specific flavoring characteristics of the fruit.

In other embodiments, the compositions of the present invention allow the amount of natural sweetener (e.g., sucralose or fructose) or artificial sweetener (e.g. sucralose) in an ingestible compositions such as a food to be reduced due the sweetness enhancing effects of the sweetness enhancer. Reduced levels of natural sweeteners may be desirable to reduce the caloric content of dietetic foods, or to reduce the natural sugar level of foods intended for diabetics.

Reduced levels of artificial sweeteners may be desirable in order to improve the sweetness characteristics as described herein. When the sweetness or sweetness delivery profile characteristics of compositions containing sucrose are compared with compositions comprising combinations of sucrose and the sweetness enhancer or salts, solvates and/or esters thereof, any conventional organoleptic techniques may be used as described herein, including paired comparison tests, difference testing, time intensity testing, descriptive analysis, etc. When compositions are deemed to have "substantially" the same sweetness or sweetness delivery profile, these characteristics are not readily distinguishable using conventional organoleptic techniques.

The amount of reduction of the natural sweetener or artificial sweetener levels, relative to the amount of natural or artificial sweetener in the conventional ingestible composition without the sweetness enhancer can be in the range of about 10 wt. % to about 90 wt. %, including reductions of about 15 wt. %, about 20 wt. %, about 25 wt. %, 30 about wt. %, about 35 wt. %, about 40 wt. %, about 45 wt. %, about 50 wt. %, about 55 wt. %, about 60 wt. %, about 65 wt. %, about 70 wt. %, about 75 wt. %, about 80 wt. %, or about 85 wt. %, inclusive of all values, ranges and subranges therebetween.

The amount of sweetness enhancer or salts, and/or solvates thereof present in ingestible compositions having reduced levels of sucrose (as disclosed herein) can range from about 0.1 ppm to about 5000 ppm, including about 0.5 ppm, about 1 ppm, about 2 ppm, about 3 ppm, about 4 ppm, about 5 ppm, about 6 ppm, about 7 ppm, about 8 ppm, about 9 ppm, about 10 ppm, about 15 ppm, about 20 ppm, about 25 ppm, about 30 ppm, about 35 ppm, about 40 ppm, about 50 ppm, about 60 ppm, about 70 ppm, about 80 ppm, about 90 ppm, about 100 ppm, about 200 ppm, about 300 ppm, about 400 ppm, about 500 ppm, about 750 ppm, about 1000 ppm, about 1500 ppm, about 2000 ppm, about 2500 ppm, about 3000 ppm, about 3500 ppm, about 4000 ppm, about 4500 ppm, or about 5000 ppm, inclusive of all values, ranges and subranges therebetween.

One embodiment of the present invention provides a process of making a composition comprising solid particles of sweetness enhancer or salts, and/or solvates thereof, and sweeteners such as sucrose, fructose, or sucralose, by a spray drying process. The term "spray-drying" broadly refers to processes involving breaking up liquid mixtures into small droplets (atomization) and rapidly removing solvent from the mixture in a spray-drying apparatus where there is a strong driving force for evaporation of solvent from the droplets. For example, sweetness enhancer or salts, and/or solvates thereof, is dissolved or dispersed in a solvent and the resulting solution and or dispersion is spray dried. The resulting spray dried particles each comprise the sweetness enhancer. In other embodiments, the sweetness enhancer in combination with a carrier and/or a sweetener (e.g. sucrose, fructose, or sucralose) can be spray dried together to form individual particles each comprising the sweetness enhancer and the carrier and/or sweetener. For example, a solution or dispersion of the sweetness enhancer and sucrose can be spray dried up to provide an intimate and essentially homogeneous blend of the sweetness enhancer and the sucrose. Solid particles of the claimed composition prepared by spray drying have different dissolution and stability properties compared to essentially the same composition prepared by other methods Solvents suitable for spray-drying can be any liquid in which each of the sweetness enhancers or salts, and/or solvates thereof and the sucrose are soluble and/or dispersed. Preferably, the solvent is also volatile with a boiling point of 150° C. or less. In addition, the solvent should have relatively low toxicity. In some embodiments, suitable spray drying solvents include water, alcohols such as methanol, ethanol, n-propanol, iso-propanol, and butanol; ketones such as acetone, methyl ethyl ketone and methyl iso-butyl ketone; esters such as ethyl acetate and propylacetate; and various other solvents such as acetonitrile, methylene chloride, toluene, and 1,1,1-trichloroethane. Lower volatility solvents such as dimethyl acetamide or dimethylsulfoxide can also be used. Mixtures of solvents, such as 50% methanol and 50% acetone, can also be used, as can mixtures with water, so long as the sucrose and the sweetness enhancer or salts, and/or solvates thereof are sufficiently soluble to make the spray-drying process practicable.

The strong driving force for solvent evaporation is generally provided by maintaining the partial pressure of solvent in the spray-drying apparatus well below the vapor pressure of the solvent at the temperature of the drying droplets. This is accomplished by (1) maintaining the pressure in the spray-drying apparatus at a partial vacuum (e.g., 0.01 to 0.50 atm); or (2) mixing the liquid droplets with a warm drying gas; or (3) both (1) and (2). In addition, a portion of the heat required for evaporation of solvent may be provided by heating the spray solution.

The relative proportion of the sweetness enhancer to the carrier and/or sweetener in the solid particle will depend on the ratio of the sweetness enhancer to the carrier and/or sweetener in the solvent utilized for spray drying. In one embodiment the relative amount of sweetness enhancer ranges from about 0.002% to about 50% weight of the particles. In another embodiment the relative amount of the sweetness enhancer ranges from about 20% to about 50% weight of the particle.

In another embodiment, the composition of the present invention comprising a plurality of particles can be prepared by a spin melt process, also known as "spin band entrapment" in which the sweetness enhancer is combined with a meltable carrier (e.g., a sugar) and incorporated into the melt-spun carrier at suitable temperature, shear force, cooling conditions to create threads or fibers of the encapsulated sweetness enhancer in the carrier. The threads or fibers of the encapsulated sweetness enhancer can then be pulverized or ground using various methods to provide particles of the encapsulated sweetness enhancer. Spin-band entrapment of the sweetness enhancer provides improved solubility in rates of dissolution compared to sweetness enhancers prepared by alternative methods.

As indicated above, the sweetness enhancers of the present invention are highly potent, and can provide significant enhancement of the sweetness properties of the composition at relatively low sweetness enhancer concentrations (e.g. at part per million levels). Thus, even part per million variations in sweetness enhancer concentration in an ingestible composition (e.g. a food) can cause significant variability in perceived sweetness and sweetness characteristics. Thus, methods for ensuring uniform and controlled concentration levels of the sweetness enhancer in an ingestible composition are important. Uniform concentrations of sweetness enhancer are less difficult to obtain in liquid ingestible compositions (e.g. beverages) when the sweetness enhancer can be readily dissolved in the liquid (e.g., water) at the desired concentration. However, it may be difficult, even in liquid ingestible compositions to reproducibly control the low required amounts of sweetness enhancer from batch-to-batch, or to rapidly incorporate the sweetness enhancer into the ingestible composition at the rates required for commercial production. Accordingly, it is often convenient to prepare a relatively concentrated "masterbatch" of the sweetness enhancer which is readily metered into the ingestible composition during formulation at a concentration suitable for quick, reproducible, and uniform mixing into the ingestible composition.

The "masterbatch" can be a solid, particulate composition, as described herein, or can be a solution or dispersion of the sweetness enhancer in a suitable solvent. When formed as a solid, particulate composition, the "masterbatch" can comprise a sweetness enhancer combined with one or more other ingredients of the ultimate ingestible composition (e.g., a sweetener, starch, etc.), using various processes such as spray drying etc. Alternatively, the sweetness enhancer may be prepared with additional additives using methods which enhance the solubility of the sweetness enhancer particles (e.g. methods which can provide amorphous sweetness enhancer particles, or methods which provide nanoparticulate sweetness enhancers). The combined sweetness enhancer and optional additional other ingredient(s) can then be blended with other solid or liquid ingredients of the ingestible composition using conventional processes. Alternatively, when formed as a liquid "masterbatch" composition, the sweetness enhancer can be dissolved in one of the liquid components of the ultimate ingestible composition (e.g., a liquid flavoring, oil, etc.) or be dissolved in an solvent in which the sweetness enhancer is highly soluble (e.g. an alkylene glycol such as propylene glycol, or an alcohol such as ethanol), and thus more highly concentrated solutions are obtained which are more easily added to the ingestible composition. In some embodiments, it is desirable that the solvent be one of the solvents naturally present in the ingestible composition (e.g., a liquid flavoring or oil). Alternatively, a solvent which has "neutral" organoleptic properties can be selected so that the solvent does not otherwise affect or change the typical organoleptic properties of the ingestible composition. Alternatively, after adding the solution or suspension of the sweetness enhancer to the ingestible composition, the solvent can be removed (e.g. by heating or vacuum) during processing of the ingestible composition. If desired, the liquid "masterbatch" comprising the sweetness enhancer can also optionally include other ingredients of the ultimate ingestible composition.

Specific ingestible compositions, for example food products, are prepared by combining solid and liquid compositions comprising sweetness enhancers by means of conventional mixing, dissolving, granulating the ingredients into various forms comprising solid, semi-solid, and liquid foods. Various additives may be mixed, ground, or granulated with the compositions of this invention to form suitable food materials. Compositions of the invention may be formulated into foods as dry powders or as liquid solutions or suspensions. In one embodiment, the composition of the present invention is formulated as a liquid or as a paste at the time of preparation. In other embodiments the composition is formulated as a dry powder with a liquid, typically water, added at a later time but prior to mixing with the other food ingredients.

It is noted that the terms "5-(neopentyloxy)-1H-benzo[c][1,2,6]thiadiazin-4-amino-2,2-dioxide", "3-(4-amino-2,2-dioxide-1H-benzo[c][1,2,6]thiadiazin-5-yloxy)-2',2'-dimethyl-N-propylpropanamide", and "Compound A" refer to the same compound and are used interchangeably throughout this application including in the Examples hereinbelow.

EXAMPLES

Example 1

Preparation of solutions of 3-(4-amino-2,2-dioxide-1H-benzo[c][1,2,6]thiadiazin-5-yloxy)-2',2'-dimethyl-N-propylpropanamide Liquid compositions of 3-(4-amino-2,2-dioxide-1H-benzo[c][1,2,6]thiadiazin-5-yloxy)-2',2'-dimethyl-N-propylpropanamide were prepared using a variety of different solvents (Table 3). It was discovered by increasing the pH of the solution with alkaline substance, such as alkali metal salt, one can increase the concentration level of 3-(4-amino-2,2-dioxide-1H-benzo[c][1,2,6]thiadiazin-5-yloxy)-2',2'-dimethyl-N-propylpropanamide in solutions. Examples of suitable alkali metal salt include, but are not limited to, sodium bicarbonate, sodium carbonate, sodium hydroxide, and the like. In propylene glycol, sodium bicarbonate will raise pH from 7.8 to 8.5; the solubility rate of 3-(4-amino-2,2-dioxide-1H-benzo[c][1,2,6]thiadiazin-5-yloxy)-2',2'-dimethyl-N-propylpropanamide will be increased from 0.5% to 1.0%.

Preparation Procedure of the Liquid Diluted Form (with Heat):

1. Weigh a desired amount of compound and sodium bicarbonate.
2. Calculate the volume of food grade solvent(s) (water, ethyl alcohol, isopropyl alcohol, butylenes glycol, propylene glycol, triacetin, glycerol, vegetable oils (soy, corn, peanut, persic, cottonseed, sesame), olive oil, fractionated coconut oil, neobee, tributyrin, mono and diglycerides, ethyl lactate, ethyl levulinate, butyl stearate, triethyl citrate, diethyl succinate, diethyl malonate, acetic acid, lactic acid, phosphoric acid, benzyl alcohol, tetrahydrofurfural alcohol, D-limonene, γ-valerolactone, butyrolactone, polyethylene glycol sorbitan monostearate (Tween®), etc. to add to the dry, weighed out compound to make a concentration of 1,000-50,000 ppm (0.1-5%).
3. Pre heat the appropriate amount of solvent to 100 to 200° F. while stirring at 1,100 rpm on a hot plate using a stir bar.
4. Add pre-weighed compound to heated solvent (when temperature reaches 100 to 200° F.).
5. Continue heating solvent and inspect to insure complete dissolution, return to the hot plate if necessary.

Preparation Procedure for Water as a Solvent:

TABLE 1

| Ingredient | Percentage (wt/wt) |
| --- | --- |
| 3-(4-amino-2,2-dioxide-1H-benzo[c][1,2,6]thiadiazin-5-yloxy)-2',2'-dimethyl-N-propylpropanamide | 1.00000 |

TABLE 1-continued

| Ingredient | Percentage (wt/wt) |
| --- | --- |
| Sodium Bicarbonate | 0.50000 |
| Water | 98.50000 |
| Total | 100.00000 |

Preparation Procedure for Propylene Glycol (PG) as a Solvent:

TABLE 2

| Ingredient | Percentage (wt/wt) |
| --- | --- |
| 3-(4-amino-2,2-dioxide-1H-benzo[c][1,2,6]thiadiazin-5-yloxy)-2',2'-dimethyl-N-propylpropanamide | 1.00000 |
| Sodium Bicarbonate | 0.50000 |

TABLE 2-continued

| Ingredient | Percentage (wt/wt) |
| --- | --- |
| Propylene Glycol | 80.00000 |
| Water | 18.50000 |
| Total | 100.00000 |

Preparation Procedure of the Liquid Diluted Form (without Heat):
1. Weigh desire amount of compound.
2. Calculate the volume of food grade solvent(s) (water, ethanol, propylene glycol, triacetin, glycerol, neobee, DI water, phosphoric acid, lactic acid, olive oil) to add to the dry, weighed out compound to make a concentration of 1,000-50,000 ppm (0.1-5%).
3. Stir solvent at 1,100 rpm on a hot plate using a stir bar.
4. Add pre-weighed compound to solvent.
5. Continue stirring and inspect to insure complete dissolution, return to the hot plate if necessary.

TABLE 3

| Solvent | Concentration (%) | Temperature (F.)/Time (minutes) | Results |
| --- | --- | --- | --- |
| Ethanol | 0.1 | Ambient/2-3 minutes | Solubilized, get clear solution |
| Ethanol | 1.0 | Ambient/over 30 minutes | Did not go into solution |
| Propylene Glycol | 0.1 | Ambient/less than 5 minutes | Solubilized, get clear solution |
| Propylene Glycol | 0.2 | Ambient/5 minutes | Solubilized, get clear solution |
| Propylene Glycol | 0.3 | Ambient/over 30 minutes | Did not go into solution |
| Propylene Glycol | 0.3 | 165° F./2-3 minutes | Solubilized, get clear solution |
| Propylene Glycol | 0.5 | Ambient/over 30 minutes | Did not go into solution |
| Propylene Glycol | 0.5 | 165° F./4-5 minutes | Solubilized, get clear solution |
| Propylene Glycol | 1.0 | Ambient/over 30 minutes | Did not go into solution |
| Propylene Glycol | 1.0 | 165° F./5 minutes | Went into solution but crashed after several hours |
| Triacetin | 0.1 | Ambient/over 30 minutes | Did not go into solution |
| Triacetin | 0.1 | 180° F./5-6 minutes | Went into solution but crashed after several hours |
| Glycerol | 0.1 | Ambient/over 30 minutes | Did not go into solution |
| Glycerol | 0.1 | 190° F./5-6 minutes | Went into solution but crashed after several hours |
| Neobee | 0.1 | Ambient/over 30 minutes | Did not go into solution |
| Neobee | 0.1 | 185° F./over 30 minutes | Did not go into solution |
| DI water | 0.1 | Ambient/over 30 minutes | Did not go into solution, the compound floating on top of water |
| DI water | 0.1 | 225° F./5 minutes | Solubilized in water but precipitate out when solution cool down |
| DI water | 10 ppm | Ambient/2½ hours | Solubilized, get clear solution |
| Phosphoric acid | 0.1 | Ambient/over 30 minutes | Did not go into solution |
| Lactic Acid | 0.1 | Ambient/5 minutes | Solubilized, get light yellow solution |
| Lactic Acid | 1.0 | Ambient/over 30 minutes | Did not go into solution |

TABLE 3-continued

| Solvent | Concentration (%) | Temperature (F.)/ Time (minutes) | Results |
|---|---|---|---|
| Lactic Acid | 1.0 | 185° F./5-6 minutes | Went into solution but crashed after overnight, solution turned yellow |
| Olive Oil (Star Original) | 0.1 | Ambient/over 30 minutes | Did not go into solution |
| Olive Oil (Star Original) | 0.1 | 150° F./over 30 minutes | Did not go into solution |

The above table shows that concentrations as high as 0.5% of 3-(4-amino-2,2-dioxide-1H-benzo[c][1,2,6]thiadiazin-5-yloxy)-2',2'-dimethyl-N-propylpropanamide can be readily obtained, in propylene glycol, whereas only about 0.1 wt. % concentrations could be obtained in ethanol, and 10 ppm solutions in water.

Example 2

Preparation of Solutions of 5-(neopentyloxy)-1H-benzo[c][1,2,6]thiadiazin-4-amino-2,2-dioxide Preparation Procedure of the Liquid Diluted Form:

Liquid compositions of 5-(neopentyloxy)-1H-benzo[c][1,2,6]thiadiazin-4-amino-2,2-dioxide are prepared using a variety of different solvents. It was discovered by increasing the pH of the solution with sodium bicarbonate, sodium carbonate, sodium hydroxide or other alkaline substance, one can increase the concentration level of 5-(neopentyloxy)-1H-benzo[c][1,2,6]thiadiazin-4-amino-2,2-dioxide in solutions. In propylene glycol, sodium bicarbonate will raise pH from 7.8 to 8.5; the solubility rate of 3-(4-amino-2,2-dioxide-1H-benzo[c][1,2,6]thiadiazin-5-yloxy)-2',2'-dimethyl-N-propylpropanamide will be increased from 0.5% to 1.0%.

Preparation Procedure of the Liquid Diluted Form (with Heat):

1. Weigh desire amount of compound and sodium bicarbonate.
2. Calculate the volume of food grade solvent(s) (water, ethyl alcohol, isopropyl alcohol, butylenes glycol, propylene glycol, triacetin, glycerol, vegetable oils (soy, corn, peanut, persic, cottonseed, sesame), olive oil, fractionated coconut oil, neobee, tributyrin, mono and diglycerides, ethyl lactate, ethyl levulinate, butyl stearate, triethyl citrate, diethyl succinate, diethyl malonate, acetic acid, lactic acid, phosphoric acid, benzyl alcohol, tetrahydrofurfural alcohol, D-limonene, γ-valerolactone, butyrolactone, polyethylene glycol sorbitan monostearate (Tween®), etc.) to add to the dry, weighed out compound to make a concentration of 1,000-50,000 ppm (0.1 to 5%).
3. Pre heat the appropriate amount of solvent to 100 to 200° F. while stirring at 1,100 rpm on a hot plate using a stir bar.
4. Add pre-weighed compound to heated solvent (when temperature reaches 100 to 200° F.).
5. Continue heating solvent and inspect to insure complete dissolution, return to the hot plate if necessary.
6. Preparation procedure for water as a solvent

TABLE 4

| Ingredient | Percentage (wt/wt) |
|---|---|
| 5-(neopentyloxy)-1H-benzo[c][1,2,6]thiadiazin-4-amino-2,2-dioxide | 1.00000 |
| Sodium Bicarbonate | 0.50000 |
| Water | 98.50000 |
| Total | 100.00000 |

7. Preparation procedure for Propylene Glycol (PG) as a solvent

TABLE 5

| Ingredient | Percentage (wt/wt) |
|---|---|
| 5-(neopentyloxy)-1H-benzo[c][1,2,6]thiadiazin-4-amino-2,2-dioxide | 1.00000 |
| Sodium Bicarbonate | 0.50000 |
| Propylene Glycol | 80.00000 |
| Water | 18.50000 |
| Total | 100.00000 |

Preparation Procedure of the Liquid Diluted Form (Without Heat):

1. Weigh desire amount of compound.
2. Calculate the volume of food grade solvent(s) (water, ethyl alcohol, isopropyl alcohol, butylene glycol, glycerol, vegetable oils (soy, corn, peanut, persic, cottonseed, sesame), fractionated coconut oil, triacetin, tributyrin, mono and diglycerides, ethyl lactate, ethyl levulinate, butyl stearate, triethyl citrate, diethyl succinate, diethyl malonate, acetic acid, lactic acid, benzyl alcohol, tetrahydrofurfural alcohol, D-limonene, γ-valerolactone, butyrolactone, polyethylene glycol sorbitan monostearate (Tween®)) to add to the dry, weighed out compound to make a concentration of 1,000 to 50,000 ppm (0.1 to 5%).
3. Stir solvent at 1,100 rpm on a hot plate using a stir bar.
4. Add pre-weighed compound to solvent.
5. Continue stirring and inspect to insure complete dissolution, return to the hot plate if necessary.

Example 3A

Sucrose as Sweetener

Testing of liquid solutions of 5-(neopentyloxy)-1H-benzo[c][1,2,6]thiadiazin-4-amino-2,2-dioxide for sweetness enhancement and other reference attributes Several types of sensory tests were used to determine the efficacy of 5-(neopentyloxy)-1H-benzo[c][1,2,6]thiadiazin- 4-amino-2,2-dioxide in enhancing sweetness of sucrose. Two types of tests were conducted:

1) Sensory scaling tests were performed using a 15-point percent sucrose equivalence scale for sweetness in order to evaluate sweetness enhancement 5-(neopentyloxy)-1H-benzo[c][1,2,6]thiadiazin-4-amino-2,2-dioxide in sucrose, or in fructose.

2) Paired comparison tests (2-alternative forced choice difference tests) were used to determine sweetness equivalence for solutions of sucrose vs. 5-(neopentyloxy)-1H-benzo[c][1,2,6]thiadiazin-4-amino-2,2-dioxide or buffer vs. 5-(neopentyloxy)-1H-benzo[c][1,2,6]thiadiazin-4-amino-2,2-dioxide.

Stimuli:

Tests were performed with sucrose or fructose. Sweetener was evaluated with and/or without 5-(neopentyloxy)-1H-benzo[c][1,2,6]thiadiazin-4-amino-2,2-dioxide at the appropriate concentration(s).

5-(Neopentyloxy)-1H-benzo[c][1,2,6]thiadiazin-4-amino-2,2-dioxide was prepared as a concentrated stock solution in ethanol to ensure dissolution of the compound. Therefore, all taste solutions contained 0.1% ethanol final concentration. Samples without compound also contained 0.1% ethanol. Low sodium phosphate buffer consists of 0.3 mM KCl, 0.5 mM $Na_2HPO_4$, and 0.175 mM $KH_2PO_4$.

In scaling test situations, the samples were rated on a 15-point scale for sweetness, ranging from 0=0% sucrose to 15=15% sucrose. To evaluate attributes other than sweetness, references are used for training and are prepared according to the table below. Note that each reference was given a score of 5 on the 15-point scale.

TABLE 6

References for Attributes

| Attribute | Reference Composition (score = 5 for all attributes) |
| --- | --- |
| Anise | 1 Good and Plenty ® per 200 ml |
| Astringent | 0.02% Alum |
| Bitterness | 0.08% Caffeine |
| Cooling | 1 Halls ® Sugar Free per 200 ml |
| Metallic | 0.015% $FeSO_4$ |
| Numbing | 7.5% Vicks ® Chloraseptic ® |
| Salty | 0.25% NaCl |
| Solvent | 0.5% Ethanol |
| Sour | 0.015% Citric Acid |
| Umami | 6 mM MSG |

Subjects:

External panelists were used for the tests. The exact number of panelists is reported with test results. Subjects were instructed not to eat or drink anything (except water) for at least 1 hour prior to the test.

Procedures:

Panelists rinsed their mouths with water prior to starting any test. Samples were presented to panelists in a randomized, counterbalanced order. Panelists rinsed with water and had up to a 1 minute delay to clear the mouth of any tastes after each evaluation. Two replicates of each test were performed, unless otherwise noted.

Line Scale Testing with 5-(Neopentyloxy)-1H-benzo[c][1,2,6]thiadiazin-4-amino-2,2-dioxide in Sucrose at pH 7.1

TABLE 7

Average Sweetness, n = 32 (16 Panelists × 2 rep).
Tukey's Value = 0.741 ($\alpha$ = 0.05), 0.664 ($\alpha$ = 0.10).

| Sample | Average | SD | St Er | Tukey (5%) | Tukey (10%) |
| --- | --- | --- | --- | --- | --- |
| 6% Sucrose | 6.5 | 1.0 | 0.2 | a | a |
| 8% Sucrose | 7.9 | 1.8 | 0.3 | b | b |
| 6% Sucrose + 25 µM 5-(neopentyloxy)-1H-benzo[c][1,2,6]thiadiazin-4-amino-2,2-dioxide | 8.7 | 1.0 | 0.2 | c | C |
| 9% Sucrose | 8.9 | 1.0 | 0.2 | c | C |
| 10% Sucrose | 9.3 | 1.1 | 0.2 | c | C |

TABLE 8

Average Bitterness, n = 32 (16 Panelists × 2 rep).
Tukey's Value = 0.219 ($\alpha$ = 0.05), 0.196 ($\alpha$ = 0.10).

| Sample | Average | SD | St Er | Tukey (5%) | Tukey (10%) |
| --- | --- | --- | --- | --- | --- |
| 9% Sucrose | 0.2 | 0.4 | 0.1 | a | A |
| 6% Sucrose | 0.3 | 0.6 | 0.1 | a | A |
| 6% Sucrose + 25 µM 5-(neopentyloxy)-1H-benzo[c][1,2,6]thiadiazin-4-amino-2,2-dioxide | 0.3 | 0.5 | 0.1 | a | A |
| 8% Sucrose | 0.3 | 0.6 | 0.1 | a | A |
| 10% Sucrose | 0.3 | 1.0 | 0.2 | a | A |

Conclusion:

The results presented above show that 6% sucrose solutions containing 25 µM 5-(neopentyloxy)-1H-benzo[c][1,2,6]thiadiazin-4-amino-2,2-dioxide are not significantly different in sweetness properties compared to 9% and 10% sucrose solutions. No significant off tastes were noted for any solutions.

Example 3B

Paired Comparison Test with 9% Sucrose versus 6% Sucrose+10 ppm (35.29 µM) 5-(Neopentyloxy)-1H-benzo[c][1,2,6]thiadiazin-4-amino-2,2-dioxide Procedure:

Panelists performed 2 directional paired comparison tests to determine which sample was sweeter. The test compared the sweetness intensity of 9% sucrose to that of 6% sucrose+10 ppm (35.29 µM) 5-(neopentyloxy)-1H-benzo[c][1,2,5]thiadiazin-4-amino-2,2-dioxide. Panelists were also to comment on the difficulty of the test and if any off tastes were perceived. Samples were completely randomized.

TABLE 9

Sample selected as more sweet by panelists:
n = 28 (14 panelists × 2 rep).

| Samples | Total |
| --- | --- |
| 9% sucrose | 9 |
| 6% Sucrose + 10 ppm (35.29 µM) 5-(neopentyloxy)-1H-benzo[c][1,2,6]thiadiazin-4-amino-2,2-dioxide | 19 |
| Total | 28 |
| 6% Sucrose + 10 ppm (35.29 µM) 5-(neopentyloxy)-1H-benzo[c][1,2,6]thiadiazin-4-amino-2,2-dioxide (p-value) | 0.087 |

Conclusion:

9 out of 28 panelists rated the 6% sucrose+10 ppm (35.29 μM) 5-(neopentyloxy)-1H-benzo[c][1,2,6]thiadiazin-4-amino-2,2-dioxide solution as sweeter than 9% sucrose (p>0.05).

Example 3C

Line Scale Testing with 5-(neopentyloxy)-1H-benzo[c][1,2,6]thiadiazin-4-amino-2,2-dioxide in LSB and Sucrose at pH 7.1

TABLE 10

Average Sweetness, n = 14 (14 Panelists × 1 rep).
Tukey's Value = 0.581 (α = 0.05), 0.520 (α = 0.10).

| Sample | Average | SD | St Er | Tukey (5%) | Tukey (10%) |
|---|---|---|---|---|---|
| 0% Sucrose | 0.0 | 0.1 | 0.0 | a | A |
| LSB + 35.3 μM (10 ppm) 5-(neopentyloxy)-1H-benzo[c][1,2,6]thiadiazin-4-amino-2,2-dioxide | 0.2 | 0.5 | 0.1 | a | A |
| 2% Sucrose | 2.1 | 0.5 | 0.1 | b | B |
| 4% Sucrose | 3.8 | 1.0 | 0.3 | c | C |
| 6% Sucrose | 6.0 | 0.0 | 0.0 | d | D |

TABLE 11

Average Sweetness, n = 14 (14 Panelists × 1 rep).
Tukey's Value = 0.887 (α = 0.05), 0.794 (α = 0.10).

| Sample | Average | SD | St Er | Tukey (5%) | Tukey (10%) |
|---|---|---|---|---|---|
| 6% Sucrose | 7.3 | 1.3 | 0.3 | a | A |
| 8% Sucrose | 8.6 | 0.7 | 0.2 | b | B |
| 6% Sucrose + 35.3 μM (10 ppm) 5-(neopentyloxy)-1H-benzo[c][1,2,6]thiadiazin-4-amino-2,2-dioxide | 9.3 | 0.7 | 0.2 | bc | Bc |
| 9% Sucrose | 9.4 | 0.6 | 0.2 | bc | Bc |
| 10% Sucrose | 9.6 | 0.6 | 0.2 | c | C |

TABLE 12

Average Bitterness, n = 14 (14 Panelists × 1 rep).
Tukey's Value = 0.804 (α = 0.05), 0.719 (α = 0.10).

| Sample | Average | SD | St Er | Tukey (5%) | Tukey (10%) |
|---|---|---|---|---|---|
| 4% Sucrose | 0.0 | 0.1 | 0.0 | a | A |
| 2% Sucrose | 0.1 | 0.3 | 0.1 | a | A |
| LSB + 35.3 μM (10 ppm) 5-(neopentyloxy)-1H-benzo[c][1,2,6]thiadiazin-4-amino-2,2-dioxide | 0.3 | 0.6 | 0.1 | a | A |
| 6% Sucrose | 0.4 | 1.3 | 0.3 | a | A |
| 0% Sucrose | 0.6 | 0.9 | 0.2 | a | A |

TABLE 13

Average Bitterness, n = 14 (14 Panelists × 1 rep).
Tukey's Value = 1.385 (α = 0.05), 1.239 (α = 0.10).

| Sample | Average | SD | St Er | Tukey (5%) | Tukey (10%) |
|---|---|---|---|---|---|
| 10% Sucrose | 0.2 | 0.5 | 0.1 | a | A |
| 6% Sucrose | 0.4 | 0.7 | 0.2 | a | A |

TABLE 13-continued

Average Bitterness, n = 14 (14 Panelists × 1 rep).
Tukey's Value = 1.385 (α = 0.05), 1.239 (α = 0.10).

| Sample | Average | SD | St Er | Tukey (5%) | Tukey (10%) |
|---|---|---|---|---|---|
| 8% Sucrose | 0.4 | 1.0 | 0.3 | a | A |
| 9% Sucrose | 0.6 | 1.9 | 0.5 | a | A |
| 6% Sucrose + 35.3 μM (10 ppm) 5-(neopentyloxy)-1H-benzo[c][1,2,6]thiadiazin-4-amino-2,2-dioxide | 0.6 | 1.8 | 0.5 | a | A |

Conclusion:

The results presented above show that LSB+35.3 μM (10 ppm) 5-(neopentyloxy)-1H-benzo[c][1,2,6]thiadiazin-4-amino-2,2-dioxide was not significantly different in sweetness than 0% sucrose (p>0.10) and had an average score of 0.2.6% Sucrose+35.3 μM (10 ppm) 5-(neopentyloxy)-1H-benzo[c][1,2,6]thiadiazin-4-amino-2,2-dioxide was not significantly different in sweetness from 8%, 9%, 10% sucrose (p>0.10) and had an average score of 9.3. There were no significant off tastes.

Example 4

Solubility of 3-(4-amino-2,2-dioxide-1H-benzo[c][1,2,6]thiadiazin-5-yloxy)-2',2'-dimethyl-N-propylpropanamide Various solutions of 3-(4-amino-2,2-dioxide-1H-benzo[c][1,2,6]thiadiazin-5-yloxy)-2',2'-dimethyl-N-propylpropanamide 3-(4-amino-2,2-dioxide-1H-benzo[c][1,2,6]thiadiazin-5-yloxy)-2',2'-dimethyl-N-propylpropanamide were prepared as indicated below.

TABLE 14

| Solvent* | Solubility (mM) | Solubility (ppm) |
|---|---|---|
| Citric Acid Buffer, pH 2.8 | 0.14 | 50 |
| Citric Acid Buffer, pH 4.0 | 0.14 | 50 |
| Phosphate Buffer, pH 7.1 | 1.7 | 602 |
| Propylene Glycol (PG) | 17.2 mM | 6096 |
| Ethanol | 10.6 mM | 3757 |
| Triacetin | 1.6 mM | 567 |
| Glycerol | 7.9 mM | 2800 |

*Citric acid buffer, pH 2.8 contains 50 mM citric acid, ~16 mM NaOH (adjust pH to 7.1 using 1.0M HCl and 1.0M NaOH);
Citric acid buffer, pH 4.0 contains 50 mM citric acid monosodium salt, ~7.4 mM NaOH (adjust pH to 7.1 using 1.0M HCl and 1.0M NaOH);
Phosphate buffer, pH 7.1 contains 50 mM $KH_2PO_4$, ~32 mM NaOH (adjust pH to 7.1 using 1.0M HCl and 1.0M NaOH).

Conclusion:

The aqueous solubility of 3-(4-amino-2,2-dioxide-1H-benzo[c][1,2,6]thiadiazin-5-yloxy)-2',2'-dimethyl-N-propylpropanamide 3-(4-amino-2,2-dioxide-1H-benzo[c][1,2,6]thiadiazin-5-yloxy)-2',2'-dimethyl-N-propylpropanamide is pH dependent, and lower solubility was found at low pH.

Example 5

Testing of Liquid Solutions of 3-(4-amino-2,2-dioxide-1H-benzo[c][1,2,6]thiadiazin-5-yloxy)-2',2'-dimethyl-N-propylpropanamide 3-(4-amino-2,2-dioxide-1H-benzo[c][1,2,6]thiadiazin-5-yloxy)-2',2'-dimethyl-N-propylpropanamide (Compound A) for Sweetness and Other Reference Attributes Liquid compositions were prepared, above, and evaluated for enhancing sweetness of sucrose and for imparting a reference attribute.

Overview:

Several types of sensory tests were used to determine the efficacy of 3-(4-amino-2,2-dioxide-1H-benzo[c][1,2,6]thiadiazin-5-yloxy)-2',2'-dimethyl-N-propylpropanamide 3-(4-amino-2,2-dioxide-1H-benzo[c][1,2,6]thiadiazin-5-yloxy)-2',2'-dimethyl-N-propylpropanamide in enhancing the sweetness of sucrose. Two types of tests were conducted:

1) Sensory scaling tests were performed using a 15-point percent sucrose equivalence scale for sweetness in order to evaluate sweetness enhancement 3-(4-amino-2,2-dioxide-1H-benzo[c][1,2,6]thiadiazin-5-yloxy)-2',2'-dimethyl-N-propylpropanamide 3-(4-amino-2,2-dioxide-1H-benzo[c][1,2,6]thiadiazin-5-yloxy)-2',2'-dimethyl-N-propylpropanamide in sucrose or in fructose.

2) Paired comparison tests (2-alternative forced choice difference tests) were used to determine sweetness equivalence for solutions of sucrose vs. 3-(4-amino-2,2-dioxide-1H-benzo[c][1,2,6]thiadiazin-5-yloxy)-2',2'-dimethyl-N-propylpropanamide 3-(4-amino-2,2-dioxide-1H-benzo[c][1,2,6]thiadiazin-5-yloxy)-2',2'-dimethyl-N-propylpropanamide or buffer vs. 3-(4-amino-2,2-dioxide-1H-benzo[c][1,2,6]thiadiazin-5-yloxy)-2',2'-dimethyl-N-propylpropanamide 3-(4-amino-2,2-dioxide-1H-benzo[c][1,2,6]thiadiazin-5-yloxy)-2',2'-dimethyl-N-propylpropanamide.

Stimuli:

Tests were performed with sucrose or fructose. The sweetener was evaluated with and/or without 3-(4-amino-2,2-dioxide-1H-benzo[c][1,2,6]thiadiazin-5-yloxy)-2',2'-dimethyl-N-propylpropanamide 3-(4-amino-2,2-dioxide-1H-benzo[c][1,2,6]thiadiazin-5-yloxy)-2',2'-dimethyl-N-propylpropanamide at the appropriate concentration(s).

3-(4-amino-2,2-dioxide-1H-benzo[c][1,2,6]thiadiazin-5-yloxy)-2',2'-dimethyl-N-propylpropanamide was prepared as a concentrated stock solution in ethanol to ensure dissolution of the 3-(4-amino-2,2-dioxide-1H-benzo[c][1,2,6]thiadiazin-5-yloxy)-2',2'-dimethyl-N-propylpropanamide. Therefore, all taste solutions contained ethanol in the final solution. Samples without 3-(4-amino-2,2-dioxide-1H-benzo[c][1,2,6]thiadiazin-5-yloxy)-2',2'-dimethyl-N-propylpropanamide also contained an equivalent concentration of ethanol. For samples involving 3-(4-amino-2,2-dioxide-1H-benzo[c][1,2,6]thiadiazin-5-yloxy)-2',2'-dimethyl-N-propylpropanamide at 5-10 ppm (up to 28 µM), the final concentration of ethanol was 0.2%; 30-40 µM, 0.4% ethanol; 50 µM, 0.5% ethanol; and 100 µM, 1% ethanol.

Taste samples were also prepared in low sodium phosphate buffer (pH 7.1; "LSB") lacking sucrose to evaluate the taste of 3-(4-amino-2,2-dioxide-1H-benzo[c][1,2,6]thiadiazin-5-yloxy)-2',2'-dimethyl-N-propylpropanamide alone. Low sodium phosphate buffer consists of 0.3 mM KCl, 0.5 mM $Na_2HPO_4$, and 0.175 mM $KH_2PO_4$.

In scaling test situations, the samples were rated on a 15-point scale for sweetness, ranging from 0=0% sucrose to 15=15% sucrose. To evaluate attributes other than sweetness, references are used for training and are prepared according to the table below. Note that each reference was given a score of 5 on the 15-point scale.

TABLE 15

References for Attributes

| Attribute | Reference Composition (score = 5 for all attributes) |
|---|---|
| Anise | 1 Good and Plenty ® per 200 mL |
| Astringent | 0.02% Alum |
| Bitterness | 0.08% Caffeine |
| Cooling | 1 Halls ® Sugar Free per 200 mL |
| Metallic | 0.015% $FeSO_4$ |
| Numbing | 7.5% Vicks ® Chloraseptic ® |
| Salty | 0.25% NaCl |
| Solvent | 0.5% Ethanol |
| Sour | 0.015% Citric Acid |
| Umami | 6 mM MSG |

Subjects:

External panelists were used for the tests. The exact number of panelists is reported with test results. Subjects were instructed not to eat or drink anything (except water) for at least 1 hour prior to the test.

Procedures:

Panelists rinsed their mouths with water prior to starting any test. Samples were presented to panelists in a randomized, counterbalanced order. Panelists rinsed with water and had up to a 1 minute delay to clear the mouth of any tastes after each evaluation. Two replicates of each test were performed, unless otherwise noted.

In scaling tests, panelists rate samples monadically for the attributes listed above (see Stimuli). In paired comparison tests, panelists taste pairs of solutions and indicate which sample is perceived to be sweeter.

Reporting:

Attributes of interest are reported for each scaling taste test. If an attribute is not listed in results, scores were very low for all samples (<1.0 average score) and/or results did not show any identifiable trends.

Sensory Scaling Tests:

Varying concentrations of sucrose dissolved in low sodium phosphate buffer (LSB; pH 7.1) vs 50 µM 3-(4-amino-2,2-dioxide-1H-benzo[c][1,2,6]thiadiazin-5-yloxy)-2',2'-dimethyl-N-propylpropanamide+6% sucrose in LSB, pH 7.1

Procedures:

Panelists rinsed their mouths with water prior to starting any test. Samples were presented to panelists in a randomized, counterbalanced order. Panelists rinsed with water and had up to a 1 minute delay to clear the mouth of any tastes after each evaluation. Two replicates of each test were performed, unless otherwise noted. In scaling tests, panelists rate samples monadically for the attributes being measured.

Line Scale Testing with 17.7 ppm (50 µM) 3-(4-amino-2,2-dioxide-1H-benzo[c][1,2,6]thiadiazin-5-yloxy)-2',2'-dimethyl-N-propylpropanamide in 6% Sucrose at pH 7.1

TABLE 16

Average Sweetness, n = 15 (15 Panelists × 1 replicate).
Tukey's Value = 0.689 ($\alpha$ = 0.05), 0.617 ($\alpha$ = 0.10).

| Samples | Average | Standard Error | Tukey (5%) | Tukey (10%) |
|---|---|---|---|---|
| 6% Sucrose | 6.3 | 0.2 | A | a |
| 8% Sucrose | 7.7 | 0.2 | B | b |
| 9% Sucrose | 9.0 | 0.2 | C | c |
| 10% Sucrose | 9.2 | 0.2 | Cd | c |
| 6% Sucrose + 50 µM 3-(4-amino-2,2-dioxide-1H-benzo[c][1,2,6]thiadiazin-5- | 9.9 | 0.1 | D | d |

TABLE 16-continued

Average Sweetness, n = 15 (15 Panelists × 1 replicate).
Tukey's Value = 0.689 (α = 0.05), 0.617 (α = 0.10).

| Samples | Average | Standard Error | Tukey (5%) | Tukey (10%) |
|---|---|---|---|---|
| yloxy)-2',2'-dimethyl-N-propylpropanamide | | | | |

TABLE 17

Average Bitterness, n = 15 (15 Panelists × 1 replicate).
Tukey's Value = 0.492 (α = 0.05), 0.440 (α = 0.10).

| Samples | Average | Standard Error | Tukey (5%) | Tukey (10%) |
|---|---|---|---|---|
| 9% Sucrose | 0.1 | 0.1 | A | a |
| 8% Sucrose | 0.1 | 0.1 | A | a |
| 10% Sucrose | 0.2 | 0.1 | A | a |
| 6% Sucrose + 50 μM 3-(4-amino-2,2-dioxide-1H-benzo[c][1,2,6]thiadiazin-5-yloxy)-2',2'-dimethyl-N-propylpropanamide | 0.2 | 0.1 | A | a |
| 6% Sucrose | 0.3 | 0.2 | A | a |

Conclusion:

Panelists indicated that 6% Sucrose+50 μM 3-(4-amino-2,2-dioxide-1H-benzo[c][1,2,6]thiadiazin-5-yloxy)-2',2'-dimethyl-N-propylpropanamide was not significantly different in sweetness compared to 10% or 12% Sucrose (p>0.10). Further, there were no significant bitter off tastes associated with the 3-(4-amino-2,2-dioxide-1H-benzo[c][1,2,6]thiadiazin-5-yloxy)-2',2'-dimethyl-N-propylpropanamide in LSB, pH 7.1.
Line Scale Testing with 8.9 ppm (25 μM) 3-(4-amino-2,2-dioxide-1H-benzo[c][1,2,6]thiadiazin-5-yloxy)-2',2'-dimethyl-N-propylpropanamide in 6% Sucrose at pH 7.1

TABLE 18

Average Sweetness, n = 24 (12 Panelists × 2 replicates).
Tukey's Value = 1.079 (α = 0.05), 0.974 (α = 0.10).

| Samples | Average | Standard Error | Tukey (5%) | Tukey (10%) |
|---|---|---|---|---|
| 6% Sucrose | 6.2 | 0.3 | A | a |
| 8% Sucrose | 8.3 | 0.2 | B | b |
| 9% Sucrose | 9.3 | 0.3 | Bc | c |
| 10% Sucrose | 9.8 | 0.2 | Cd | cd |
| 6% Sucrose + 25 μM 3-(4-amino-2,2-dioxide-1H-benzo[c][1,2,6]thiadiazin-5-yloxy)-2',2'-dimethyl-N-propylpropanamide | 10.6 | 0.3 | De | de |
| 12% Sucrose | 11.1 | 0.3 | E | e |

TABLE 19

Average Bitterness, n = 24 (12 Panelists × 2 replicates).
Tukey's Value = 0.159 (α = 0.05), 0.143 (α = 0.10).

| Samples | Average | Standard Error | Tukey (5%) | Tukey (10%) |
|---|---|---|---|---|
| 12% Sucrose | 0.0 | 0.0 | A | a |
| 9% Sucrose | 0.1 | 0.0 | A | a |
| 6% Sucrose + 25 μM 3-(4-amino-2,2-dioxide-1H-benzo[c][1,2,6]thiadiazin-5- | 0.1 | 0.0 | A | a |

TABLE 19-continued

Average Bitterness, n = 24 (12 Panelists × 2 replicates).
Tukey's Value = 0.159 (α = 0.05), 0.143 (α = 0.10).

| Samples | Average | Standard Error | Tukey (5%) | Tukey (10%) |
|---|---|---|---|---|
| yloxy)-2',2'-dimethyl-N-propylpropanamide | | | | |
| 10% Sucrose | 0.1 | 0.1 | A | a |
| 8% Sucrose | 0.1 | 0.1 | A | a |
| 6% Sucrose | 0.2 | 0.1 | A | a |

Conclusion:

Panelists indicated that 6% Sucrose+25 μM 3-(4-amino-2,2-dioxide-1H-benzo[c][1,2,6]thiadiazin-5-yloxy)-2',2'-dimethyl-N-propylpropanamide is not significantly different in sweetness than 10% or 12% sucrose (p>0.10). Further, there were no significant off tastes associated with 6% Sucrose+25 μM 3-(4-amino-2,2-dioxide-1H-benzo[c][1,2,6]thiadiazin-5-yloxy)-2',2'-dimethyl-N-propylpropanamide.
Line Scale Testing with 8.9 ppm (25 μM) 3-(4-amino-2,2-dioxide-1H-benzo[c][1,2,6]thiadiazin-5-yloxy)-2',2'-dimethyl-N-propylpropanamide on its own at pH 7

TABLE 20

Average Sweetness, n = 30 (15 Panelists × 2 replicates).
Tukey's Value = 0.535 (α = 0.05), 0.479 (α = 0.10).

| Samples | Average | Standard Error | Tukey (5%) | Tukey (10%) |
|---|---|---|---|---|
| 0% Sucrose | 0.2 | 0.1 | a | A |
| 25 μM 3-(4-amino-2,2-dioxide-1H-benzo[c][1,2,6]thiadiazin-5-yloxy)-2',2'-dimethyl-N-propylpropanamide | 0.6 | 0.2 | a | A |
| 2% Sucrose | 2.3 | 0.2 | b | B |
| 4% Sucrose | 4.2 | 0.2 | c | C |
| 6% Sucrose | 5.8 | 0.1 | d | D |

TABLE 21

Average Bitterness, n = 30 (15 Panelists × 2 replicates).
Tukey's Value = 0.218 (α = 0.05), 0.195 (α = 0.10).

| Samples | Average | Standard Error | Tukey (5%) | Tukey (10%) |
|---|---|---|---|---|
| 4% Sucrose | 0.2 | 0.1 | a | A |
| 6% Sucrose | 0.2 | 0.1 | a | A |
| 25 μM 3-(4-amino-2,2-dioxide-1H-benzo[c][1,2,6]thiadiazin-5-yloxy)-2',2'-dimethyl-N-propylpropanamide | 0.2 | 0.1 | a | A |
| 2% Sucrose | 0.3 | 0.1 | a | A |
| 0% Sucrose | 0.3 | 0.1 | a | A |

Conclusion:

25.0 μM (8.9 ppm) 3-(4-amino-2,2-dioxide-1H-benzo[c][1,2,6]thiadiazin-5-yloxy)-2',2'-dimethyl-N-propylpropanamide was not significantly different in sweetness than 0% sucrose (p>0.10). Further, there were no significant off tastes associated with the presence of 3-(4-amino-2,2-dioxide-1H-benzo[c][1,2,6]thiadiazin-5-yloxy)-2',2'-dimethyl-N-propylpropanamide.
Line Scale Testing with 17.7 ppm (50 μM) 3-(4-amino-2,2-dioxide-1H-benzo[c][1,2,6]thiadiazin-5-yloxy)-2',2'-dimethyl-N-propylpropanamide on its own at pH 7.1

TABLE 22

Average Sweetness, n = 14 (14 Panelists × 1 replicate).
Tukey's Value = 1.013 (α = 0.05), 0.906 (α = 0.10).

| Samples | Average | Standard Error | Tukey (5%) | Tukey (10%) |
|---|---|---|---|---|
| 0% Sucrose | 0.2 | 0.1 | a | a |
| 50 μM 3-(4-amino-2,2-dioxide-1H-benzo[c][1,2,6]thiadiazin-5-yloxy)-2',2'-dimethyl-N-propylpropanamide | 1.3 | 0.4 | b | b |
| 2% Sucrose | 2.3 | 0.2 | c | c |
| 4% Sucrose | 4.3 | 0.3 | d | d |
| 6% Sucrose | 5.7 | 0.2 | e | e |

50 μM 3-(4-amino-2,2-dioxide-1H-benzo[c][1,2,6]thiadiazin-5-yloxy)-2',2'-dimethyl-N-propylpropanamide in a low sodium buffer (LSB) had an average score between 0% Sucrose and 2% sucrose (1.3). There were no significant off tastes associated with the presence of 3-(4-amino-2,2-dioxide-1H-benzo[c][1,2,6]thiadiazin-5-yloxy)-2',2'-dimethyl-N-propylpropanamide.

Line Scale. Evaluation of 1, 2, 4, 7, & 10 ppm 3-(4-amino-2,2-dioxide-1H-benzo[c][1,2,6]thiadiazin-5-yloxy)-2',2'-dimethyl-N-propylpropanamide in Sucrose at pH 7.1

TABLE 23

Average Sweetness, n = 30 (15 Panelists × 2 replicates). Tukey's Value = 1.138 (α = 0.05), 1.043 (α = 0.10).

| Samples | Average | Standard Error | Tukey (5%) | Tukey (10%) |
|---|---|---|---|---|
| 6% Sucrose | 6.7 | 0.2 | a | a |
| 6% Sucrose + 1 ppm 3-(4-amino-2,2-dioxide-1H-benzo[c][1,2,6]thiadiazin-5-yloxy)-2',2'-dimethyl-N-propylpropanamide (2.82 μM) | 7.5 | 0.3 | ab | ab |
| 6% Sucrose + 2 ppm 3-(4-amino-2,2-dioxide-1H-benzo[c][1,2,6]thiadiazin-5-yloxy)-2',2'-dimethyl-N-propylpropanamide (5.64 μM) | 8.0 | 0.2 | b | b |
| 8% Sucrose | 8.3 | 0.3 | b | b |
| 6% Sucrose + 4 ppm 3-(4-amino-2,2-dioxide-1H-benzo[c][1,2,6]thiadiazin-5-yloxy)-2',2'-dimethyl-N-propylpropanamide (11.29 μM) | 10.1 | 0.3 | c | c |
| 6% Sucrose + 7 ppm 3-(4-amino-2,2-dioxide-1H-benzo[c][1,2,6]thiadiazin-5-yloxy)-2',2'-dimethyl-N-propylpropanamide (19.75 μM) | 10.3 | 0.3 | cd | cd |
| 10% Sucrose | 10.3 | 0.4 | cd | cd |
| 6% Sucrose + 10 ppm 3-(4-amino-2,2-dioxide-1H-benzo[c][1,2,6]thiadiazin-5-yloxy)-2',2'-dimethyl-N-propylpropanamide (28.22 μM) | 10.9 | 0.3 | cd | cd |
| 12% Sucrose | 11.2 | 0.2 | d | d |

TABLE 24

Average Bitterness, n = 30 (15 Panelists × 2 replicates). Tukey's Value = 0.611 (α = 0.05), 0.560 (α = 0.10).

| Samples | Average | Standard Error | Tukey (5%) | Tukey (10%) |
|---|---|---|---|---|
| 10% Sucrose | 0.2 | 0.1 | a | a |
| 6% Sucrose + 7 ppm 3-(4-amino-2,2-dioxide-1H-benzo[c][1,2,6]thiadiazin-5-yloxy)-2',2'-dimethyl-N-propylpropanamide (19.75 μM) | 0.3 | 0.1 | a | a |
| 12% Sucrose | 0.3 | 0.1 | a | a |
| 8% Sucrose | 0.4 | 0.2 | a | a |
| 6% Sucrose | 0.4 | 0.1 | a | a |
| 6% Sucrose + 4 ppm 3-(4-amino-2,2-dioxide-1H-benzo[c][1,2,6]thiadiazin-5-yloxy)-2',2'-dimethyl-N-propylpropanamide (11.29 μM) | 0.4 | 0.1 | a | a |
| 6% Sucrose + 2 ppm 3-(4-amino-2,2-dioxide-1H-benzo[c][1,2,6]thiadiazin-5-yloxy)-2',2'-dimethyl-N-propylpropanamide (5.64 μM) | 0.4 | 0.2 | a | a |
| 6% Sucrose + 10 ppm 3-(4-amino-2,2-dioxide-1H-benzo[c][1,2,6]thiadiazin-5-yloxy)-2',2'-dimethyl-N-propylpropanamide (28.22 μM) | 0.6 | 0.2 | a | a |
| 6% Sucrose + 1 ppm 3-(4-amino-2,2-dioxide-1H-benzo[c][1,2,6]thiadiazin-5-yloxy)-2',2'-dimethyl-N-propylpropanamide (2.82 μM) | 0.7 | 0.3 | a | a |

Conclusion:

Panelists indicated that 6% Sucrose+7 or 10 ppm 3-(4-amino-2,2-dioxide-1H-benzo[c][1,2,6]thiadiazin-5-yloxy)-2',2'-dimethyl-N-propylpropanamide was not significantly different than 10% or 12% sucrose (p>0.10). Further, panelists indicated that 6% sucrose+4 ppm 3-(4-amino-2,2-dioxide-1H-benzo[c][1,2,6]thiadiazin-5-yloxy)-2',2'-dimethyl-N-propylpropanamide was not significantly different than 10% sucrose (p>0.10). Further, there were no significant off tastes associated with 3-(4-amino-2,2-dioxide-1H-benzo[c][1,2,6]thiadiazin-5-yloxy)-2',2'-dimethyl-N-propylpropanamide in LSB, pH 7.1.

Line Scale Testing of 5 ppm 3-(4-amino-2,2-dioxide-1H-benzo[c][1,2,6]thiadiazin-5-yloxy)-2',2'-dimethyl-N-propylpropanamide in various sucrose concentrations at pH 7.1

Conclusion:

Panelists indicated that 1% sucrose+5 ppm 3-(4-amino-2,2-dioxide-1H-benzo[c][1,2,6]thiadiazin-5-yloxy)-2',2'-dimethyl-N-propylpropanamide was not significantly different in sweetness than 2% sucrose (p>0.10). Panelists indicated that 2% sucrose+5 ppm 3-(4-amino-2,2-dioxide-1H-benzo[c][1,2,6]thiadiazin-5-yloxy)-2',2'-dimethyl-N-propylpropanamide was not significantly different in sweetness than 4% sucrose. Panelists indicated that 4% sucrose+5 ppm 3-(4-amino-2,2-dioxide-1H-benzo[c][1,2,6]thiadiazin-5-yloxy)-2',2'-dimethyl-N-propylpropanamide was not significantly different in sweetness than 8% sucrose (p>0.10). Further, here were no significant off tastes associated with the 3-(4-amino-2,2-dioxide-1H-benzo[c][1,2,6]thiadiazin-5-yloxy)-2',2'-dimethyl-N-propylpropanamide in LSB, pH 7.1.

TABLE 25

Average Sweetness, n = 30 (15 Panelists × 2 replicates). Tukey's Value = 0.910 ($\alpha$ = 0.05), 0.836 ($\alpha$ = 0.10).

| Samples | Average | Standard Error | Tukey (5%) | Tukey (10%) |
| --- | --- | --- | --- | --- |
| 1% Sucrose | 1.2 | 0.1 | a | a |
| 2% Sucrose | 2.2 | 0.2 | b | b |
| 1% Sucrose + 5 ppm 3-(4-amino-2,2-dioxide-1H-benzo[c][1,2,6]thiadiazin-5-yloxy)-2',2'-dimethyl-N-propylpropanamide (14.11 μM) | 2.5 | 0.2 | b | b |
| 4% Sucrose | 4.4 | 0.2 | c | c |
| 2% Sucrose + 5 ppm 3-(4-amino-2,2-dioxide-1H-benzo[c][1,2,6]thiadiazin-5-yloxy)-2',2'-dimethyl-N-propylpropanamide (14.11 μM) | 4.6 | 0.4 | c | c |
| 6% Sucrose | 6.4 | 0.2 | d | d |
| 4% Sucrose + 5 ppm 3-(4-amino-2,2-dioxide-1H-benzo[c][1,2,6]thiadiazin-5-yloxy)-2',2'-dimethyl-N-propylpropanamide (14.11 μM) | 8.1 | 0.3 | e | e |
| 8% Sucrose | 8.7 | 0.3 | e | e |
| 6% Sucrose + 5 ppm 3-(4-amino-2,2-dioxide-1H-benzo[c][1,2,6]thiadiazin-5-yloxy)-2',2'-dimethyl-N-propylpropanamide (14.11 μM) | 10.2 | 0.3 | f | f |
| 10% Sucrose | 10.5 | 0.3 | f | f |

TABLE 26

Average Bitterness, n = 30 (15 Panelists × 2 replicates). Tukey's Value = 0.686 ($\alpha$ = 0.05), 0.630 ($\alpha$ = 0.10).

| Samples | Average | Standard Error | Tukey (5%) | Tukey (10%) |
| --- | --- | --- | --- | --- |
| 4% Sucrose + 5 ppm 3-(4-amino-2,2-dioxide-1H-benzo[c][1,2,6]thiadiazin-5-yloxy)-2',2'-dimethyl-N-propylpropanamide (14.11 μM) | 0.2 | 0.1 | a | a |
| 2% Sucrose + 5 ppm 3-(4-amino-2,2-dioxide-1H-benzo[c][1,2,6]thiadiazin-5-yloxy)-2',2'-dimethyl-N-propylpropanamide (14.11 μM) | 0.2 | 0.1 | a | a |
| 10% Sucrose | 0.3 | 0.1 | a | a |
| 8% Sucrose | 0.3 | 0.1 | a | a |
| 4% Sucrose | 0.3 | 0.1 | a | a |
| 2% Sucrose | 0.3 | 0.1 | a | a |
| 1% Sucrose + 5 ppm 3-(4-amino-2,2-dioxide-1H-benzo[c][1,2,6]thiadiazin-5-yloxy)-2',2'-dimethyl-N-propylpropanamide (14.11 μM) | 0.4 | 0.1 | a | a |
| 1% Sucrose | 0.4 | 0.2 | a | a |
| 6% Sucrose + 5 ppm 3-(4-amino-2,2-dioxide-1H-benzo[c][1,2,6]thiadiazin-5-yloxy)-2',2'-dimethyl-N-propylpropanamide (14.11 μM) | 0.4 | 0.2 | a | a |
| 6% Sucrose | 0.6 | 0.4 | a | a |

Line Scale Testing with 8.9 ppm (25 µM) 3-(4-amino-2,2-dioxide-1H-benzo[c][1,2,6]thiadiazin-5-yloxy)-2',2'-dimethyl-N-propylpropanamide in Various Sucrose Concentrations at pH 7.1

TABLE 27

Average Sweetness, n = 28 (14 Panelists × 2 replicates). Tukey's Value = 0.712 (α = 0.05), 0.647 (α = 0.10).

| Samples | Average | Standard Error | Tukey (5%) | Tukey (10%) |
|---|---|---|---|---|
| 2% Sucrose | 2.0 | 0.1 | a | a |
| 4% Sucrose | 4.2 | 0.3 | b | b |
| 2% Sucrose + 25 µM 3-(4-amino-2,2-dioxide-1H-benzo[c]-[1,2,6]thiadiazin-5-yloxy)-2',2'-dimethyl-N-propylpropanamide | 5.6 | 0.3 | c | c |
| 6% Sucrose | 6.1 | 0.2 | c | c |
| 4% Sucrose + 25 µM 3-(4-amino-2,2-dioxide-1H-benzo[c]-[1,2,6]thiadiazin-5-yloxy)-2',2'-dimethyl-N-propylpropanamide | 8.3 | 0.2 | d | d |
| 8% Sucrose | 8.4 | 0.3 | d | d |
| 10% Sucrose | 9.6 | 0.1 | e | e |

TABLE 28

Average Bitterness, n = 28 (14 Panelists × 2 replicates). Tukey's Value = 0.186 (α = 0.05), 0.169 (α = 0.10).

| Samples | Average | Standard Error | Tukey (5%) | Tukey (10%) |
|---|---|---|---|---|
| 10% Sucrose | 0.1 | 0.0 | a | a |
| 4% Sucrose | 0.1 | 0.0 | a | a |
| 6% Sucrose | 0.1 | 0.1 | a | ab |
| 2% Sucrose | 0.1 | 0.1 | a | ab |
| 8% Sucrose | 0.2 | 0.1 | ab | abc |
| 2% Sucrose + 25 µM 3-(4-amino-2,2-dioxide-1H-benzo[c]-[1,2,6]thiadiazin-5-yloxy)-2',2'-dimethyl-N-propylpropanamide | 0.3 | 0.1 | ab | bc |
| 4% Sucrose + 25 µM 3-(4-amino-2,2-dioxide-1H-benzo[c]-[1,2,6]thiadiazin-5-yloxy)-2',2'-dimethyl-N-propylpropanamide | 0.3 | 0.1 | b | c |

Conclusion:

Panelists indicated that 2% sucrose+8.9 ppm 3-(4-amino-2,2-dioxide-1H-benzo[c][1,2,6]thiadiazin-5-yloxy)-2',2'-dimethyl-N-propylpropanamide was not significantly different in sweetness than 6% sucrose (p>0.10). Panelists indicated that 4% sucrose+8.9 ppm 3-(4-amino-2,2-dioxide-1H-benzo[c][1,2,6]thiadiazin-5-yloxy)-2',2'-dimethyl-N-propylpropanamide was not significantly different in sweetness than 8% sucrose (p>0.10). Further, here were no significant off tastes associated with the 3-(4-amino-2,2-dioxide-1H-benzo[c][1,2,6]thiadiazin-5-yloxy)-2',2'-dimethyl-N-propylpropanamide in LSB, pH 7.1.

Example 6

Fructose as Sweetener

Sensory evaluations were performed using fructose as the sweetener and 3-(4-amino-2,2-dioxide-1H-benzo[c][1,2,6]thiadiazin-5-yloxy)-2',2'-dimethyl-N-propylpropanamide as the sweetness enhancer, using methods similar to those using sucrose, above. Threshold Study By Line Scale Testing with 10.6 ppm (30 µM) and 14.2 ppm (40 µM) 3-(4-amino-2,2-dioxide-1H-benzo[c][1,2,6]thiadiazin-5-yloxy)-2',2'-dimethyl-N-propylpropanamide at pH 7.1

TABLE 29

Average Sweetness, n = 30 (15 Panelists × 2 replicates). Tukey's Value = 0.486 (α = 0.05), 0.438 (α = 0.10).

| Samples | Average | Standard Error | Tukey (5%) | Tukey (10%) |
|---|---|---|---|---|
| 0% Fructose | 0.1 | 0.1 | a | a |
| 30 µM 3-(4-amino-2,2-dioxide-1H-benzo[c][1,2,6]-thiadiazin-5-yloxy)-2',2'-dimethyl-N-propylpropanamide | 0.6 | 0.2 | b | b |
| 40 µM 3-(4-amino-2,2-dioxide-1H-benzo[c][1,2,6]-thiadiazin-5-yloxy)-2',2'-dimethyl-N-propylpropanamide | 1.1 | 0.2 | c | c |
| 2% Fructose | 2.2 | 0.2 | d | d |
| 4% Fructose | 4.5 | 0.2 | e | e |
| 6% Fructose | 5.9 | 0.1 | f | f |

TABLE 30

Average Bitterness, n = 30 (15 Panelists × 2 replicates). Tukey's Value = 0.507 (α = 0.05), 0.458 (α = 0.10).

| Samples | Average | Standard Error | Tukey (5%) | Tukey (10%) |
|---|---|---|---|---|
| 30 µM 3-(4-amino-2,2-dioxide-1H-benzo[c][1,2,6]-thiadiazin-5-yloxy)-2',2'-dimethyl-N-propylpropanamide | 0.4 | 0.1 | a | a |
| 2% Fructose | 0.4 | 0.2 | a | a |
| 6% Fructose | 0.4 | 0.2 | a | a |
| 0% Fructose | 0.4 | 0.1 | a | a |
| 4% Fructose | 0.5 | 0.2 | a | a |
| 40 µM 3-(4-amino-2,2-dioxide-1H-benzo[c][1,2,6]-thiadiazin-5-yloxy)-2',2'-dimethyl-N-propylpropanamide | 0.6 | 0.2 | a | a |

Conclusion:

Both fructose solutions containing 30.0 µM and 40 µM 3-(4-amino-2,2-dioxide-1H-benzo[c][1,2,6]thiadiazin-5-yloxy)-2',2'-dimethyl-N-propylpropanamide were not significantly different in sweetness compared to 0% and 2% fructose respectively (p>0.10). Further, there were no significant off tastes associated with the presence of 3-(4-amino-2,2-dioxide-1H-benzo[c][1,2,6]thiadiazin-5-yloxy)-2',2'-dimethyl-N-propylpropanamide.

Line Scale Testing with 35.4 ppm (100 µM) 3-(4-amino-2,2-dioxide-1H-benzo[c][1,2,6]thiadiazin-5-yloxy)-2',2'-dimethyl-N-propylpropanamide in 6% Fructose at pH 7.1

TABLE 31

Average Sweetness, n = 14 (14 Panelists × 1 replicate). Tukey's Value = 1.914 (α = 0.05), 1.713 (α = 0.10).

| Samples | Average | Standard Error | Tukey (5%) | Tukey (10%) |
|---|---|---|---|---|
| 6% Fructose | 7.1 | 0.5 | a | a |
| 8% Fructose | 8.3 | 0.5 | ab | ab |
| 6% Fructose + 100 µM 3-(4-amino-2,2-dioxide-1H-benzo[c]-[1,2,6]thiadiazin-5-yloxy)-2',2'-dimethyl-N-propylpropanamide | 9.2 | 0.4 | bc | b |
| 9% Fructose | 9.4 | 0.6 | bc | bc |
| 10% Fructose | 11.1 | 0.5 | c | c |

TABLE 32

Average Bitterness, n = 14 (14 Panelists × 1 replicate). Tukey's Value = 1.214 ($\alpha$ = 0.05), 1.086 ($\alpha$ = 0.10).

| Samples | Average | Standard Error | Tukey (5%) | Tukey (10%) |
|---|---|---|---|---|
| 10% Fructose | 0.2 | 0.1 | a | a |
| 9% Fructose | 0.3 | 0.2 | a | a |
| 8% Fructose | 0.3 | 0.3 | a | a |
| 6% Fructose + 100 µM 3-(4-amino-2,2-dioxide-1H-benzo[c]-[1,2,6]thiadiazin-5-yloxy)-2',2'-dimethyl-N-propylpropanamide | 0.3 | 0.2 | a | a |
| 6% Fructose | 0.7 | 0.5 | a | a |

Conclusion:

Panelists indicated that the sweetness of 6% fructose+100 µM 3-(4-amino-2,2-dioxide-1H-benzo[c][1,2,6]thiadiazin-5-yloxy)-2',2'-dimethyl-N-propylpropanamide was not significantly different than 8% or 9% fructose (p>0.10). Further, there were no significant off tastes associated with the enhancer in LSB, pH 7.1.

Line Scale Testing with 8.9 ppm (25 µM) 3-(4-amino-2,2-dioxide-1H-benzo[c][1,2,6]thiadiazin-5-yloxy)-2',2'-dimethyl-N-propylpropanamide in Fructose at pH 7.1

TABLE 33

Average Sweetness, n = 26 (13 Panelists × 2 replicates). Tukey's Value = 0.714 ($\alpha$ = 0.05), 0.639 ($\alpha$ = 0.10).

| Samples | Average | Standard Error | Tukey (5%) | Tukey (10%) |
|---|---|---|---|---|
| 6% Fructose | 6.9 | 0.2 | a | a |
| 6% Fructose + 25 µM 3-(4-amino-2,2-dioxide-1H-benzo[c]-[1,2,6]thiadiazin-5-yloxy)-2',2'-dimethyl-N-propylpropanamide | 7.8 | 0.2 | b | b |
| 8% Fructose | 8.6 | 0.2 | c | c |
| 9% Fructose | 9.3 | 0.1 | cd | d |
| 10% Fructose | 9.5 | 0.1 | d | d |

TABLE 34

Average Bitterness, n = 26 (13 Panelists × 2 replicates). Tukey's Value = 0.143 ($\alpha$ = 0.05), 0.128 ($\alpha$ = 0.10).

| Samples | Average | Standard Error | Tukey (5%) | Tukey (10%) |
|---|---|---|---|---|
| 9% Fructose | 0.1 | 0.0 | a | a |
| 10% Fructose | 0.1 | 0.1 | ab | a |
| 6% Fructose | 0.2 | 0.1 | ab | ab |
| 6% Fructose + 25 µM 3-(4-amino-2,2-dioxide-1H-benzo[c]-[1,2,6]thiadiazin-5-yloxy)-2',2'-dimethyl-N-propylpropanamide | 0.2 | 0.1 | ab | ab |
| 8% Fructose | 0.3 | 0.2 | b | b |

Conclusion:

Panelists indicated that 6% fructose+25 µM 3-(4-amino-2,2-dioxide-1H-benzo[c][1,2,6]thiadiazin-5-yloxy)-2',2'-dimethyl-N-propylpropanamide was significantly sweeter than 6% fructose (p>0.05) and had an average sweetness between 6% fructose and 8% fructose. Further, here were no significant off tastes associated with the 3-(4-amino-2,2-dioxide-1H-benzo[c][1,2,6]thiadiazin-5-yloxy)-2',2'-dimethyl-N-propylpropanamide in LSB, pH 7.1.

Example 7

Paired Comparison Test with 1% Sucrose versus 9.9 ppm (28 µM) 3-(4-amino-2,2-dioxide-1H-benzo[c][1,2,6]thiadiazin-5-yloxy)-2',2'-dimethyl-N-propylpropanamide Procedure:

Panelists evaluated two solutions in a paired comparison taste test procedure. They were instructed to select the sweeter of the two samples. They were also asked to comment on how difficult it was to tell the difference in sweetness between both samples and if any off tastes were perceived.

TABLE 35

Sample selected as more sweet by panelists: 1% Sucrose. n = 32 (16 panelists × 2 replicates).

| Samples | Total |
|---|---|
| 1% Sucrose | 28 |
| 28 µM 3-(4-amino-2,2-dioxide-1H-benzo[c][1,2,6]thiadiazin-5-yloxy)-2',2'-dimethyl-N-propylpropanamide | 4 |
| Total | 32 |
| Confidence | 0.999 |
| 28 µM 3-(4-amino-2,2-dioxide-1H-benzo[c][1,2,6]thiadiazin-5-yloxy)-2',2'-dimethyl-N-propylpropanamide (p-value) | 0.001 |

Conclusion:

The panel demonstrated that 1% sucrose was significantly sweeter than 28 µM 3-(4-amino-2,2-dioxide-1H-benzo[c][1,2,6]thiadiazin-5-yloxy)-2',2'-dimethyl-N-propylpropanamide (p>0.05).

Paired Comparison Test with 6% Fructose Versus 6% Fructose+8.9 ppm (25 µM) 3-(4-amino-2,2-dioxide-1H-benzo[c][1,2,6]thiadiazin-5-yloxy)-2',2'-dimethyl-N-propylpropanamide Procedure:

Panelists evaluated two solutions in a paired comparison taste test procedure and were instructed to select the sweeter of the two samples.

TABLE 36

Sample selected as sweeter by panelists N = 25 (25 panelists × 1 replicate).

| Samples | Test 1 |
|---|---|
| 6% Fructose | 5 |
| 6% Fructose + 25 µM 3-(4-amino-2,2-dioxide-1H-benzo[c][1,2,6]thiadiazin-5-yloxy)-2',2'-dimethyl-N-propylpropanamide | 20 |
| Total | 25 |
| Confidence | 0.999 |
| 6% Fructose + 25 µM 3-(4-amino-2,2-dioxide-1H-benzo[c][1,2,6]thiadiazin-5-yloxy)-2',2'-dimethyl-N-propylpropanamide (p-value) | 0.001 |

Conclusion:

The test demonstrated that 6% fructose+25 µM 3-(4-amino-2,2-dioxide-1H-benzo[c][1,2,6]thiadiazin-5-yloxy)-2',2'-dimethyl-N-propylpropanamide was significantly sweeter than 6% fructose (p<0.05).

Paired Comparison Test with 7% Fructose Versus 6% Fructose+8.9 ppm (25 µM) 3-(4-amino-2,2-dioxide-1H-benzo[c][1,2,6]thiadiazin-5-yloxy)-2',2'-dimethyl-N-propylpropanamide Procedure:

Panelists evaluated two solutions in a paired comparison taste test procedure and were instructed to select the sweeter of the two samples.

TABLE 37

Sample selected as more sweet by panelists
N = 25 (25 panelists × 1 replicate).

| Samples | Test 1 |
|---|---|
| 7% Fructose | 13 |
| 6% Fructose + 25 μM 3-(4-amino-2,2-dioxide-1H-benzo[c][1,2,6]thiadiazin-5-yloxy)-2',2'-dimethyl-N-propylpropanamide | 12 |
| Total | 25 |
| Confidence | 0.166 |
| 6% Fructose + 25 μM 3-(4-amino-2,2-dioxide-1H-benzo[c][1,2,6]thiadiazin-5-yloxy)-2',2'-dimethyl-N-propylpropanamide (p-value) | 0.834 |

Conclusions:

The test demonstrated that there was no significant difference in sweetness between 6% fructose+25 μM 3-(4-amino-2,2-dioxide-1H-benzo[c][1,2,6]thiadiazin-5-yloxy)-2',2'-dimethyl-N-propylpropanamide and 7% fructose (p<0.01).

Example 8

Cola Composition

Cola compositions were prepared using the following ingredients and evaluated for sweetness and/or lingering taste. A cola composition containing a reduced amount of sucrose (compared to "100% sucrose" cola) and 3 ppm or 3.19 ppm of 3-(4-amino-2,2-dioxide-1H-benzo[c][1,2,6]thiadiazin-5-yloxy)-2',2'-dimethyl-N-propylpropanamide (or salts, and/or solvates thereof) had approximately the same sweetness as the "100% sucrose" cola formulation.

TABLE 38

| Ingredients | Sample weight (grams) 100% sucrose Cola Prototype | Sample weight (grams) Reduced sucrose Cola Prototype |
|---|---|---|
| Caramel Color # 105 (DDWilliamson) | 0.15 | 0.15 |
| Caramel Color # 050 (DDWilliamson) | 0.05 | 0.05 |
| Sucrose Solution (50%) | 20.00 | 13.40 |
| Cola Emulsion (Formula A) | 0.45 | 0.45 |
| Phosphoric Acid (50%) | 0.40 | 0.40 |
| Carbonated Water | 78.95 | 85.55 |
| Propylene glycol (PG) | 0.08 | |
| 3-(4-amino-2,2-dioxide-1H-benzo[c][1,2,6]thiadiazin-5-yloxy)-2',2'-dimethyl-N-propylpropanamide | | 3 ppm or 3.19 ppm |
| Total Weight | 100.000 | 100.000 |

The cola emulsion, above, contains the ingredients below:

TABLE 39

| Ingredient | Sample weight (grams) |
|---|---|
| Lime oil distilled | 0.4 |
| Nutmeg oil | 0.24 |

TABLE 39-continued

| Ingredient | Sample weight (grams) |
|---|---|
| Orange oil | 0.3 |
| Vanilla extract | 0.3 |
| Gum arabic | 7.2 |
| Cinnamon oleoresins | 0.2 |
| Cola flavor | 0.2 |
| Water | 190.96 |
| Total | 199.80 |

Paired Comparison Test with Cola Made with 100% Sucrose Versus Cola Made with 60% Sucrose+3 ppm 3-(4-amino-2,2-dioxide-1H-benzo[c][1,2,6]thiadiazin-5-yloxy)-2',2'-dimethyl-N-propylpropanamide Procedure:

Panelists evaluated two solutions in a paired comparison taste test procedure and were instructed to select the sweeter of the two samples.

TABLE 40

Sample selected as sweeter by panelists, n = 39 (13 panelists × 3 reps).

| Samples | Total |
|---|---|
| Cola with 100% Sucrose | 21 |
| Cola with 60% Sucrose + 3 ppm (8.47 μM) 3-(4-amino-2,2-dioxide-1H-benzo[c][1,2,6]thiadiazin-5-yloxy)-2',2'-dimethyl-N-propylpropanamide | 18 |
| Total | 39 |
| Cola with 60% Sucrose + 3 ppm (8.47 μM) 3-(4-amino-2,2-dioxide-1H-benzo[c][1,2,6]thiadiazin-5-yloxy)-2',2'-dimethyl-N-propylpropanamide (p-value) | 0.749 |

Conclusions:

The panel demonstrated that there was no significant difference in sweetness between 60% sucrose cola+3 ppm (8.47 μM) 3-(4-amino-2,2-dioxide-1H-benzo[c][1,2,6]thiadiazin-5-yloxy)-2',2'-dimethyl-N-propylpropanamide and 100% sucrose cola (p>0.10).

Paired Comparison Test with Cola Made with 100% Sucrose Versus Cola Made with 66% Sucrose+3.19 ppm 5-(neopentyloxy)-1H-benzo[c][1,2,6]thiadiazin-4-amino-2,2-dioxide Procedure:

Panelists evaluated two solutions in a paired comparison taste test procedure and were instructed to select the sweeter of the two samples.

TABLE 41

Sample selected as sweeter by panelists: Cola with 100% Sucrose vs. Cola with 66% Sucrose + 3.19 ppm (8.47 μM) 3-(4-amino-2,2-dioxide-1H-benzo[c][1,2,6]thiadiazin-5-yloxy)-2',2'-dimethyl-N-propylpropanamide, n = 39 (13 panelists × 3 reps).

| Samples | Total |
|---|---|
| Cola with 100% Sucrose | 17 |
| Cola with 66% Sucrose + 3.19 ppm (8.47 μM) 3-(4-amino-2,2-dioxide-1H-benzo[c][1,2,6]thiadiazin-5-yloxy)-2',2'-dimethyl-N-propylpropanamide | 22 |
| Total | 39 |
| Cola with 66% Sucrose + 3.19 ppm (8.47 μM) 3-(4-amino-2,2-dioxide-1H-benzo[c][1,2,6]thiadiazin-5-yloxy)-2',2'-dimethyl-N-propylpropanamide (p-value) | 0.522 |

Conclusions:

The panel demonstrated that there was no significant difference in sweetness between 66% sucrose cola+3.19 ppm (8.47 µM) 3-(4-amino-2,2-dioxide-1H-benzo[c][1,2,6]thiadiazin-5-yloxy)-2',2'-dimethyl-N-propylpropanamide and 100% sucrose cola (p>0.10).

Example 9

Chocolate Beverage Powder

Chocolate beverage powder can be prepared using, for example, the following ingredients and reconstituted in milk.

TABLE 42

| Ingredients | Sample weight (%) Full sugar Choc. Bev. Powder | Sample weight (%) 50% sugar Choc. Bev. Powder |
|---|---|---|
| Sugar, granulated | 78.67 | 64.84 |
| Cocoa, (dutched) | 20.00 | 32.97 |
| Lecithin | 0.53 | 0.88 |
| Salt, granulated | 0.40 | 0.66 |
| Vanillin | 0.20 | 0.33 |
| Maltodextrin | 0.20 | 0.33 |
| Total Weight % | 100.0000 | 100.0000 |

Procedure:

A KitchenAide mixer is equipped with a wire whip attachment and used for mixing sugar and salt for 5 seconds. Lecithin is added and the resulting mixture is mixed for an additional 5 seconds. Cocoa, maltodextrin, and vanillin are added and the mixture is mixed for another 10 seconds.

Procedure:

Chocolate Milk Preparation

Chocolate milk preparations were prepared by combining a chocolate beverage mixture with milk and the appropriate amount of sugar, or sugar and 3-(4-amino-2,2-dioxide-1H-benzo[c][1,2,6]thiadiazin-5-yloxy)-2',2'-dimethyl-N-propylpropanamide. 75.0 grams of Full Sugar Chocolate Beverage Powder was mixed into 250 mls of cold (40° F.) 2% lowfat milk and mixed with a wire whip until dissolved. 45.5 grams of the 50% Sugar Chocolate Beverage Powder was mixed into 250 mls of cold (40° F.) 2% lowfat milk and mixed with a wire whip until the powder was dissolve. The Compound A was dissolved into a 0.10% concentration level in propylene glycol and added to the chocolate milk, mixed with a wire whip until homogenous, about 2 minutes.

Human Taste Tests:

Chocolate Milk Paired Comparison

Chocolate Milk+100% Sugar vs. Chocolate Milk+50% Sugar+3-(4-amino-2,2-dioxide-1H-benzo[c][1,2,6]thiadiazin-5-yloxy)-2',2'-dimethyl-N-propylpropanamide (7 ppm/(20 µM))

Conclusions:

Panelists found that the chocolate milk with 50% Sugar (p<0.05)+3-(4-amino-2,2-dioxide-1H-benzo[c][1,2,6]thiadiazin-5-yloxy)-2',2'-dimethyl-N-propylpropanamide (7 ppm/(20 µM)) was not significantly different in sweetness that chocolate milk with full sugar (p>0.10).

TABLE 43

Sample selected as sweeter by panelists chocolate milk + 100% Sugar vs. chocolate milk + 50% Sugar + 3-(4-amino-2,2-dioxide-1H-benzo[c][1,2,6]thiadiazin-5-yloxy)-2',2'-dimethyl-N-propylpropanamide (7 ppm/(20 µM)). n = 51 (17 panelists × 3 reps).

| Samples | Total |
|---|---|
| Chocolate Milk with 100% Sugar | 23 |
| Chocolate Milk with 50% Sugar + 3-(4-amino-2,2-dioxide-1H-benzo[c][1,2,6]thiadiazin-5-yloxy)-2',2'-dimethyl-N-propylpropanamide (7 ppm/(20 µM)) | 28 |
| Total | 51 |
| Chocolate Milk + 50% Sugar + 3-(4-amino-2,2-dioxide-1H-benzo[c][1,2,6]thiadiazin-5-yloxy)-2',2'-dimethyl-N-propylpropanamide (7 ppm/(20 µM)) selected (p-value) | 0.576 |

Example 10

Strawberry Yogurt

Two strawberry yogurt compositions were prepared and then mixed with plain, nonfat yogurt. One strawberry fruit composition was sweetened with a mixture of sucrose and fructose, and a second strawberry fruit composition was sweetened with ⅓ less sucrose and 3 ppm of 3-(4-amino-2,2-dioxide-1H-benzo[c][1,2,6]thiadiazin-5-yloxy)-2',2'-dimethyl-N-propylpropanamide. The compositions of the two fruit compositions are as follows:

TABLE 44

| PRODUCT DESCRIPTION | 42% Sucrose *used in finished product % | ⅓ reduced sucrose * used in finished product % |
|---|---|---|
| Strawberry. IQF quarter dice | 28.50 | 28.50 |
| KRYSTAR 300 Crystalline Fructose | 7.00 | 8.00 |
| REZISTA, Mod. Food Starch, Staley | 3.00 | 4.00 |
| Sucrose | 42.00 | 28.14 |
| Cellulose Gum | 0.15 | 0.18 |
| Strawberry Flavor (Edgar#22-93-0109) | 1.80 | 1.80 |
| Potassium Sorbate | 0.05 | 0.05 |
| Water | 19.30 | 31.13 |
| 3-(4-amino-2,2-dioxide-1H-benzo[c][1,2,6]thiadiazin-5-yloxy)-2',2'-dimethyl-N-propylpropanamide | | 3 ppm |

Yogurt Paired Comparison Test

Procedure:

Panelists evaluated two yogurt compositions in a paired comparison taste test procedure and were instructed to select the sweeter of the two samples. They perform a total of three paired comparison tests each containing the following samples: Strawberry Yogurt with 100% Sucrose vs. Strawberry Yogurt with 66.6% Sucrose+3 ppm (8.47 µM) 3-(4-amino-2,2-dioxide-1H-benzo[c][1,2,6]thiadiazin-5-yloxy)-2',2'-dimethyl-N-propylpropanamide.

Products:

Strawberry Yogurt=Strawberry IQF, fructose, food starch, sucrose, cellulose gum, strawberry flavor, potassium sorbate, water, plain non fat yogurt, propylene glycol, 3-(4-amino-2,2-dioxide-1H-benzo[c][1,2,6]thiadiazin-5-yloxy)-2',2'-dimethyl-N-propylpropanamide Strawberry Yogurt Preparation: 1000 g batches of finished strawberry yogurt was made by adding 16% (by weight) strawberry fruit prep to 84% (by weight) plain nonfat yogurt and mixing with a wire whip until homogenous, a minimum of five minutes. The Compound A was dissolved into a 0.10% concentration level in propylene glycol and then added to the strawberry yogurt and mixed with a wire whip until homogenous, about 5 minutes.

Conclusions:

Panelists found Strawberry Yogurt with 66.6% Sucrose+3 ppm (8.47 µM) 3-(4-amino-2,2-dioxide-1H-benzo[c][1,2,6]thiadiazin-5-yloxy)-2',2'-dimethyl-N-propylpropanamide was not significantly different in sweetness than Strawberry Yogurt with 100% Sucrose (p>0.10).

TABLE 45

Sample selected as sweeter by panelists, n = 72 (16 external panelists × 3 reps; 8 internal panelists × 3 reps).

| Samples | Total |
|---|---|
| Strawberry Yogurt with 6.7% Sucrose | 39 |
| Strawberry Yogurt with 4.5% Sucrose + 3 ppm (8.47 µM) 3-(4-amino-2,2-dioxide-1H-benzo[c][1,2,6]thiadiazin-5-yloxy)-2',2'-dimethyl-N-propylpropanamide | 33 |
| Total | 72 |
| Strawberry Yogurt with 4.5% Sucrose + 3 ppm (8.47 µM) 3-(4-amino-2,2-dioxide-1H-benzo[c][1,2,6]thiadiazin-5-yloxy)-2',2'-dimethyl-N-propylpropanamide selected (p-value) | 0.556 |

Example 11

Flavored Water

Two sweetened water solutions were prepared and compared: Flavored Water with 9% Sucrose vs. Flavored Water with 6% Sucrose+2.3 ppm (6.49 µM) of 5-(neopentyloxy)-1H-benzo[c][1,2,6]thiadiazin-4-amino-2,2-dioxide.

| PRODUCT DESCRIPTION | 100% Sucrose Full Sugar % | 1/3 reduced Sucrose % |
|---|---|---|
| Sugar, Granulated | 9.01 | 6.01 |
| Strawberry Flavor, Artificial | 0.30 | 0.30 |
| Water | 90.64 | 93.64 |
| Malic Acid | 0.05 | 0.05 |
| 3-(4-amino-2,2-dioxide-1H-benzo[c][1,2,6]thiadiazin-5-yloxy)-2',2'-dimethyl-N-propylpropanamide | 0.00 | 2.3 or 2.44 ppm |

Mixing procedures: Dissolve acid into the water using a Lightnin® blender, mix for 5 minutes. Add sugar and continue to mix until dissolved. Add flavors last. Dissolve Compound A into a 0.50% propylene glycol mixture, add last and mix for another 5 minutes.

Procedure:

Panelists evaluated two sweetened water solutions in a paired comparison taste test procedure and were instructed to select the sweeter of the two samples. They perform a total of three paired comparison tests each containing the following samples: Flavored Water with 9% Sucrose vs. Flavored Water with 6% Sucrose+2.3 ppm (6.49 µM) 5-(neopentyloxy)-1H-benzo[c][1,2,6]thiadiazin-4-amino-2,2-dioxide.

The results are shown in the following table:

TABLE 46

Sample selected as sweeter by panelists: Flavored Water with 9% Sucrose vs. Flavored Water with 6% Sucrose + 2.3 ppm (6.49 µM) 5-(neopentyloxy)-1H-benzo[c][1,2,6]thiadiazin-4-amino-2,2-dioxide. n = 45 (15 panelists × 3 reps).

| Samples | Total |
|---|---|
| Flavored Water with 9% Sucrose | 22 |
| Flavored Water with 6% Sucrose + 2.3 ppm (6.49 µM) 5-(neopentyloxy)-1H-benzo[c][1,2,6]thiadiazin-4-amino-2,2-dioxide | 23 |
| Total | 45 |
| Flavored Water with 6% Sucrose + 2.3 ppm (6.49 µM) 5-(neopentyloxy)-1H-benzo[c][1,2,6]thiadiazin-4-amino-2,2-dioxide selected (p-value) | >0.880 |

Conclusions:

Panelists found Flavored Water with 9% Sucrose was not significantly different in sweetness than Flavored Water with 6% Sucrose+2.3 ppm (6.49 µM) 5-(neopentyloxy)-1H-benzo[c][1,2,6]thiadiazin-4-amino-2,2-dioxide (p>0.10).

Example 12

Flavored Water

Two sweetened water solutions were prepared and compared: Flavored Water with 9% Sucrose vs. Flavored Water with 6% Sucrose+2.44 ppm (6.49 µM) of 3-(4-amino-2,2-dioxide-1H-benzo[c][1,2,6]thiadiazin-5-yloxy)-2',2'-dimethyl-N-propylpropanamide.

Procedure:

Panelists evaluated two sweetened water solutions in a paired comparison taste test procedure and were instructed to select the sweeter of the two samples. They perform a total of three paired comparison tests each containing the following samples: Flavored Water with 9% Sucrose vs. Flavored Water with 6% Sucrose+2.44 ppm (6.49 µM) 3-(4-amino-2,2-dioxide-1H-benzo[c][1,2,6]thiadiazin-5-yloxy)-2',2'-dimethyl-N-propylpropanamide.

The results are shown in the following table:

TABLE 47

Sample selected as sweeter by panelists: Flavored Water with 9% Sucrose vs. Flavored Water with 6% Sucrose + 2.44 ppm (6.49 µM) 3-(4-amino-2,2-dioxide-1H-benzo[c][1,2,6]thiadiazin-5-yloxy)-2',2'-dimethyl-N-propylpropanamide. n = 42 (14 panelists × 3 reps).

| Samples | Total |
|---|---|
| Flavored Water with 9% Sucrose | 22 |
| Flavored Water with 6% Sucrose + 2.44 ppm (6.49 µM) 3-(4-amino-2,2-dioxide-1H-benzo[c][1,2,6]thiadiazin-5-yloxy)-2',2'-dimethyl-N-propylpropanamide | 20 |
| Total | 42 |
| Flavored Water with 6% Sucrose + 2.44 ppm (6.49 µM) 3-(4-amino-2,2-dioxide-1H-benzo[c][1,2,6]thiadiazin-5-yloxy)-2',2'-dimethyl-N-propylpropanamide selected (p-value) | 0.878 |

Conclusions:

The panelists found that Flavored Water with 9% Sucrose was not significantly different in sweetness than Flavored Water with 6% Sucrose+2.44 ppm (6.49 µM) 3-(4-amino-2, 2-dioxide-1H-benzo[c][1,2,6]thiadiazin-5-yloxy)-2',2'-dimethyl-N-propylpropanamide (p>0.10).

Example 13

General Procedure for Preparation of Spray Dried Solid Particles

Solid particles are prepared using a spray-drying apparatus. The sweetness enhancer and carrier(s) are mixed in a solvent (water) together with maltodextrin, optionally sodium bicarbonate, and gum arabic to form a spray solution. A Buchi lab spray dryer model # B-290 is utilized for the lab formulation and procedure work for spray drying. Solid particles comprising the composition of the invention are prepared according to the spray dried formulation in Table 48.

The solid particles are prepared according to the following procedure:

Water is pre-weighed in a beaker. The Star-Dri 10 maltodextrin, gum arabic, sodium bicarbonate and sweetness enhancer are pre-weighed and set aside separately. The water beaker is placed on a heat plate equipped with a stirring bar and the stir knob (700-800 rpm) turned on to create a vortex in the water beaker. Heat the water to 190-200° F. and add the sweetness enhancer and sodium bicarbonate with stirring until dissolve. Maltodextrin and gum arabic are added with stirring until all are dissolved. The solution is then spray dried using a Buchi mini spray dryer with specifications of inlet temperature=155-160° C., outlet temperature=100° C. and pump %=30.

TABLE 48

| 1.5% spray dry formula | | |
|---|---|---|
| Ingredient | Percentage | Percent of Dry (wt/wt) |
| Maltodextrin | 19.10 | 47.7500 |
| Gum Arabic | 20.00 | 50.0000 |
| Sweetness enhancer 3-(4-amino-2,2-dioxide-1H-benzo[c][1,2,6]thiadiazin-5-yloxy)-2',2'-dimethyl-N-propylpropanamide | 0.60 | 1.5000 |
| Sodium Bicarbonate | 0.30 | 0.7500 |
| Water | 60.00 | 0.00000 |
| Total | 100.00 | 100.0000 |

The carrier may consist of maltodextrin, starch, gum arabic and combinations thereof. The concentration of sweetness enhancer can range from about 1-5%.

Example 14

General Procedure for Preparation of Spin Melt Solid Particles

Solid particles are prepared using SpunMatrix™ apparatus. The sweetness enhancer and carrier(s) (Polydextrose, maltodextrin, gum arabic and/or starch) are mixed in a container. A SpunMatrix™ apparatus is utilized for the lab formulation and procedure work for spin melt solid particles. Solid particles comprising the composition of the invention are prepared according to the formulation in Table 49.

The solid particles are prepared according to the following procedure: Polydextrose, Star-Dri 10 Maltodextrin and sweetness enhancer are pre-weighed and mixed well, then set aside. The SpunMatrix™ apparatus is activated, and the blend is slowly loaded into the SpunMatrix™ apparatus.

TABLE 49

| Ingredient | Percentage (wt/wt) |
|---|---|
| Polydextrose | 45.00 |
| Maltodextrin | 45.00 |
| Sweet Enhancer | 10.00 |
| Total | 100.00 |

The carrier may consist of polydextrose, maltodextrin, starch, gum arabic and combinations thereof.
The concentration of sweetness enhancer can range from about 1 to 30%.

Example 15

Frosted Flakes Cereal

Frosted Flakes cereals were prepared using the following ingredients and evaluated for sweetness. The sugar frosting contained a reduced amount of sucrose (compared to the "100% sucrose" sugar coated flake cereal) and 15 ppm of 3-(4-amino-2,2-dioxide-1H-benzo[c][1,2,6]thiadiazin-5-yloxy)-2',2'-dimethyl-N-propylpropanamide.

TABLE 50

| Ingredients | Sample weight (%) Full Sucrose Frosted Flakes Cereal | Sample weight (%) Reduced Sucrose Frosted Flakes Cereal |
|---|---|---|
| Sugar, granulated | 24.49 | 13.38 |
| Sugar, powdered | 3.56 | 1.94 |
| Water | 7.06 | 5.75 |
| Tapioca Dextrin | 0.27 | 0.22 |
| Gum Arabic | 0.20 | 0.16 |
| Corn Flakes | 64.42 | 78.55 |
| 3-(4-amino-2,2-dioxide-1H-benzo[c][1,2,6]thiadiazin-5-yloxy)-2',2'-dimethyl-N-propylpropanamide. | | 15 ppm |
| Total Weight % | 100.0000 | 100.0000 |

Procedure:
Mixing Procedure for Syrup:

A Kitchen Aide mixer is equipped with a wire whip attachment and used for mixing sugar and tapioca dextrin. Mix for 5 minutes. Dissolve gum arabic in water using a magnetic stir bar and stir plate. Mix for 1 minute. Add the remaining dry ingredients and compound (if necessary) and heat until the solution reaches 230° F. for 1 minute. The compound was solubilized in ethanol to a 0.30% concentration level before adding to the syrup; this gave a better homogeneity throughout the syrup.

Mixing Procedure for Frosted Flakes:

Place weighed amount of corn flakes in the tumbler. Add desired amount of syrup as soon as the syrup is ready. Tumble for 30 minutes while heating the flakes with a heat gun. Further dry the flakes in the convection oven for 200° F. for 50 minutes.

Human Taste Tests:

Frosted Flakes Paired Comparison test with 100% Frosted Flakes Cereal vs 33% Reduced Sugar Frosted Flakes+3-(4-amino-2,2-dioxide-1H-benzo[c][1,2,6]thiadiazin-5-yloxy)-2',2'-dimethyl-N-propylpropanamide (15 ppm).

Procedure:

Panelists evaluated the two cereal samples in a paired comparison taste test procedure and were instructed to select the sweeter of the two samples.

TABLE 51

Sample selected as sweeter by panelists, n = 42 (14 panelists × 3 reps).

| Samples | Test 1 | Test 2 | Test 3 | Total |
|---|---|---|---|---|
| 100% Sucrose Frosted Flakes | 8 | 5 | 5 | 18 |
| 33% Reduced Sucrose Frosted Flakes + 15 ppm 3-(4-amino-2,2-dioxide-1H-benzo[c][1,2,6]thiadiazin-5-yloxy)-2',2'-dimethyl-N-propylpropanamide | 6 | 9 | 9 | 24 |
| Total | 14 | 14 | 14 | 42 |
| 33% Reduced Sucrose Frosted Flakes + 15 ppm 3-(4-amino-2,2-dioxide-1H-benzo[c][1,2,6]thiadiazin-5-yloxy)-2',2'-dimethyl-N-propylpropanamide (p-value) | >0.791 | 0.424 | 0.424 | 0.441 |

Conclusions:

Panelists found that 100% Sucrose Frosted Flakes was not significantly different in sweetness that 33% Reduced Sucrose Frosted Flakes+15 ppm 3-(4-amino-2,2-dioxide-1H-benzo[c][1,2,6]thiadiazin-5-yloxy)-2',2'-dimethyl-N-propylpropanamide (p=0.441).

We claim:

1. A composition comprising (i) a plurality of solid particles, each particle comprising a sweetness enhancer, wherein the sweetness enhancer is 3-(4-amino-2,2-dioxide-1H-benzo[c][1,2,6]thiadiazin-5-yloxy)-2',2'-dimethyl-N-propylpropanamide, or salts and/or solvates thereof, and (ii) one or more sweeteners, wherein the ratio of sweetener to sweetness enhancer is from about 2:1 to about 100,000:1.

2. The composition of claim 1, wherein the solid particles are in the form of crystalline particles, amorphous particles, granules, nanoparticles, or combinations thereof.

3. The composition of claim 1, wherein the one or more sweeteners are selected from the group consisting of a sugar, sucrose, fructose, glucose, corn syrup, high fructose corn syrup, syrups or sweetener concentrates derived from natural fruit and vegetable sources, erythritol, isomalt, lactitol, mannitol, sorbitol, xylitol, maltodextrin, glycerol, threitol, arabitol, ribitol, dulcitol, miraculin, superaspartame, saccharin, saccharin-sodium salt, acesulfame-K, cyclamate, sodium cyclamate, alitame, trehalose, melizitose, melibiose, raffinose, palatinose, lactulose, cyclamic acid, mogroside, tagatose, maltose, galactose, L-rhamnose, D-sorbose, mannose, lactose, L-arabinose, D-ribose, D-glyceraldehyde, curculin, brazzein, neohesperidin dihydrochalcone (NHDC), neotame, aspartame, aspartame derivatives, D-tryptophan, D-leucine, D-threonine, glycine, D-asparagine, D-phenylalanine, L-proline, maltitol, hydrogenated glucose syrup (HGS), magap, sucralose, lugduname, sucrononate, sucrooctate, monatin, phyllodulcin, hydrogenated starch hydrolyzate (HSH), stevioside, rebaudioside A, Stevia-based glycosides, lo han guo, thaumatin, monellin, carrelame, guanidine-based sweeteners, and combinations thereof.

4. The composition of claim 1, comprising salts of 3-(4-amino-2,2-dioxide-1H-benzo[c][1,2,6]thiadiazin-5-yloxy)-2',2'-dimethyl-N-propylpropanamide selected from the group consisting of sodium salts, potassium salts, calcium salts, and magnesium salts.

5. A solution or suspension comprising
a sweetness enhancer, wherein the sweetness enhancer is 3-(4-amino-2,2-dioxide-1H-benzo[c][1,2,6]thiadiazin-5-yloxy)-2',2'-dimethyl-N-propylpropanamide, or salts and/or solvates thereof; and
at least one food grade solvent
wherein the weight ratio of sweetness enhancer to food grade solvent ranges from about 1:2 to about 1:1000.

6. The solution or suspension of claim 5, wherein the food grade solvent comprises a food grade alcohol, food grade alkylene glycol, or a food grade liquid flavoring.

7. The solution or suspension of claim 5, wherein the food grade solvent comprises water, ethyl alcohol, isopropyl alcohol, butylene glycol, glycerol, vegetable oils, soy oil, canola oil, cottonseed oil, corn oil, peanut oil, persic oil, cottonseed oil, sesame oil, fractionated coconut oil, triacetin, tributyrin, mono and diglycerides, ethyl lactate, ethyl levulinate, butyl stearate, triethyl citrate, diethyl succinate, diethyl malonate, acetic acid, lactic acid, benzyl alcohol, tetrahydrofurfural alcohol, D-limonene, γ-valerolactone, butyrolactone, polyethylene glycol, polypropylene glycol, sorbitan monostearate, or combinations thereof.

8. The solution or suspension of claim 5, wherein the food grade solvent comprises a food grade liquid flavoring comprising lemon oil, lime oil, orange oil, clove oil, vanilla extract, cola flavor, a vegetable oil, soy oil, canola oil, olive oil, cottonseed oil, peanut oil, or combinations thereof.

9. The solution or suspension of claim 5, comprising 3-(4-amino-2,2-dioxide-1H-benzo[c][1,2,6]thiadiazin-5-yloxy)-2',2'-dimethyl-N-propylpropanamide sodium salt in a food grade alkylene glycol.

10. An ingestible composition comprising the composition of claim 1 in combination with at least one edible ingredient.

11. The ingestible composition of claim 10, wherein the edible ingredient is selected from the group consisting of baked goods and baking mixes, beverages, alcoholic beverages and beverage mixes, non-alcoholic beverages and beverage mixes, powdered beverages, breakfast cereals, cheeses, chewing gum, coffee and tea, condiments and relishes, confections and frostings, dairy product substitutes, fats and oils, frozen dairy desserts and mixes, fruit and water ices, gelatins, puddings, and fillings, gravies and sauces, pet foods, hard candy and cough drops, herbs, seeds, spices, seasonings, blends, extracts, flavorings, jams and jellies, meat products, milk products, processed fruits and fruit juices, processed vegetables and vegetable juices, snack foods, soft candy, soups and soup mixes, sugar substitutes, sweet sauces, toppings, and syrups, baby food, baby formula, coffee whiteners, crackers, dairy products, egg products, fish products, frozen dinners, grain mixtures, granulated sugar, hard candy, non-alcoholic beverages, nut products, poultry, processed fruits, reconstituted vegetables, ready to eat meals, salad dressings, sugar substitutes, sweet sauce, sweetener blends, table top sweeteners, tea, tea products, tea beverages, and oral pharmaceutical dosage forms.

12. The ingestible composition of claim 11, wherein the ingestible composition is a powdered beverage mix.

13. The ingestible composition of claim 12, wherein the powdered beverage mix is a powdered non-carbonated non-alcoholic beverage mix.

14. The ingestible composition of claim 12, wherein said ingestible composition comprises at least one sweetener selected from the group consisting of sucrose, fructose, glucose, sorbitol, sucralose, aspartame, cyclamate, acesulfame K, saccharin, stevia, rebaudioside A, and combinations thereof.

15. The ingestible composition of claim 14, wherein the concentration of sweetness enhancer ranges from about 0.01 ppm to about 50 ppm.

16. The ingestible composition of claim 12, comprising:
about 0.02 wt. % to about 80 wt. % of sweetener;
about 15 wt. % to about 40 wt. % of flavor; and
about 30 ppm to about 50 ppm of the sweetness enhancer.

17. The ingestible composition of claim 16, wherein said composition is a chocolate drink powder, said flavor comprises cocoa and vanillin, said sweetener is at least one high intensity sweetener selected from the group consisting of sucralose, aspartame, cyclamate, acesulfame K, saccharin, stevia, rebaudioside A, and combinations thereof, and the amount of the high intensity sweetener ranges from about 1 ppm to about 20 ppm.

18. The ingestible composition of claim 16, wherein said composition is a chocolate drink powder, said flavor comprises cocoa and vanillin, said sweetener is at least one carbohydrate sweetener selected from the group consisting of sucrose, fructose, glucose, sorbitol, and combinations thereof, and the amount of the carbohydrate sweetener ranges from about 20 wt. % to about 70 wt. %.

19. The ingestible composition of claim 11, wherein the ingestible composition is a cereal.

20. The ingestible composition of claim 19, comprising:
about 50 wt. % to about 75 wt. % of cereal;
about 10 wt. % to about 25 wt. % sweetener; and
about 5 ppm to about 25 ppm of the sweetness enhancer.

21. The ingestible composition of claim 11, wherein the ingestible composition is a tabletop sweetener.

22. An ingestible composition comprising the solution or suspension of claim 5 and at least one edible ingredient.

23. The ingestible composition of claim 22, wherein the ingestible composition is selected from the group consisting of a liquid beverage ready to drink (RTD), a carbonated beverage, a non-carbonated non-alcoholic beverage, an alcoholic beverage, soda, tea, tea products, coffee, coffee products, flavored water, a new age beverage, a nutraceutical beverage, and a pharmaceutical beverage.

24. The ingestible composition of claim 23, wherein said ingestible composition comprises at least one sweetener selected from the group consisting of sucrose, fructose, glucose, sorbitol, sucralose, aspartame, cyclamate, acesulfame K, saccharin, stevia, rebaudioside A, and combinations thereof.

25. The ingestible composition of claim 24, wherein the concentration of sweetness enhancer ranges from about 0.01 ppm to about 100 ppm.

26. The ingestible composition of claim 22, wherein the ingestible composition is selected from the group consisting of a beverage syrup, a non-carbonated non-alcoholic beverage syrup, and an alcoholic beverage syrup.

27. The ingestible composition of claim 26, wherein said ingestible composition comprises at least one sweetener selected from the group consisting of sucrose, fructose, glucose, sorbitol, sucralose, aspartame, cyclamate, acesulfame K, saccharin, stevia, rebaudioside A, and combinations thereof.

28. The ingestible composition of claim 27, wherein the concentration of sweetness enhancer ranges from about 0.01 ppm to about 50 ppm.

29. The ingestible composition of claim 22, wherein the ingestible composition is a comestible selected from the group consisting of fruit and water ices, gelatins, puddings, and fillings, gravies and sauces, jams and jellies, soups and soup mixes, sugar substitutes, sweet sauces, toppings, and syrups.

30. The ingestible composition of claim 23, wherein the ingestible composition is a cola beverage.

31. The ingestible composition of claim 30, comprising:
about 70 wt. % to about 90 wt. % of carbonated water;
about 2 wt. % to about 15 wt. % of sweetener;
about 0.1 wt. % to about 1 wt. % of flavoring; and
about 2 ppm to about 20 ppm of the sweetness enhancer.

32. The ingestible composition of claim 31, wherein the sweetness enhancer comprises 3-(4-amino-2,2-dioxide-1H-benzo[c][1,2,6]thiadiazin-5-yloxy)-2',2'-dimethyl-N-propylpropanamide or a salt thereof.

33. A method of making an ingestible composition comprising combining the composition of claim 1 with at least one edible ingredient.

34. A method of making an ingestible composition, comprising combining the composition of claim 5 with at least one edible ingredient.

35. A method of reducing the amount of sweetener in a sweetener-containing ingestible composition, comprising:
replacing the sweetener in the sweetener-containing ingestible composition with an effective amount of sweetener and the composition of claim 1, thereby forming a sweetness enhancer-containing ingestible composition.

36. A method of reducing the amount of sweetener in a sweetener-containing ingestible composition, comprising:
replacing the sweetener in the sweetener-containing ingestible composition with an effective amount of sweetener and the liquid or suspension of claim 5, thereby forming a sweetness enhancer-containing ingestible composition.

37. A method of improving the flavor of a sweetener in a sweetener-containing ingestible composition, comprising:
replacing the sweetener in the sweetener-containing ingestible composition with an effective amount of sweetener and the composition of claim 1, thereby forming a sweetness enhancer-containing ingestible composition.

38. A method of improving the flavor of a sweetener in a sweetener-containing ingestible composition, comprising:
replacing the sweetener in the sweetener-containing ingestible composition with an effective amount of sweetener and the liquid or suspension of claim 5, thereby forming a sweetness enhancer-containing ingestible composition.

39. A method of enhancing the sweetness of a sweetener-containing ingestible composition comprising adding sodium, potassium, calcium, or magnesium salts of 3-(4-amino-2,2-dioxide-1H-benzo[c][1,2,6]thiadiazin-5-yloxy)-2',2'-dimethyl-N-propylpropanamide to the sweetener-containing ingestible composition, wherein the amount by weight of the sodium, potassium, calcium, or magnesium salts of 3-(4-amino-2,2-dioxide-1H-benzo[c][1,2,6]thiadiazin-5-yloxy)-2',2'-dimethyl-N-propylpropanamide ranges from about 0.1 ppm to about 5000 ppm of the sweetener-containing ingestible composition.

40. The method of claim 39, wherein the amount of the sodium, potassium, calcium, or magnesium salts of 3-(4-amino-2,2-dioxide-1H-benzo[c][1,2,6]thiadiazin-5-yloxy)-2',2'-dimethyl-N-propylpropanamide ranges from about 0.1 ppm to about 90 ppm.

* * * * *

UNITED STATES PATENT AND TRADEMARK OFFICE
CERTIFICATE OF CORRECTION

| | | |
|---|---|---|
| PATENT NO. | : 8,609,173 B2 | Page 1 of 1 |
| APPLICATION NO. | : 13/056848 | |
| DATED | : December 17, 2013 | |
| INVENTOR(S) | : Rhondi Shigemura et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 201 days.

Signed and Sealed this
Thirteenth Day of May, 2014

Michelle K. Lee
*Deputy Director of the United States Patent and Trademark Office*